US012592760B2

(12) United States Patent
Ma et al.

(10) Patent No.: US 12,592,760 B2
(45) Date of Patent: Mar. 31, 2026

(54) BEAM SELECTION FOR RANDOM ACCESS IN A HIERARCHICAL BEAM ARCHITECTURE

(71) Applicant: QUALCOMM Incorporated, San Diego, CA (US)

(72) Inventors: Liangping Ma, San Diego, CA (US); Xiao Feng Wang, San Diego, CA (US); Jun Ma, San Diego, CA (US); Peter Gaal, San Diego, CA (US); Juan Montojo, San Diego, CA (US); Wanshi Chen, San Diego, CA (US); Alberto Rico Alvarino, San Diego, CA (US); Ayan Sengupta, San Diego, CA (US); Bharat Shrestha, San Diego, CA (US); Huilin Xu, Temecula, CA (US); Yiqing Cao, Beijing (CN); Umesh Phuyal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 327 days.

(21) Appl. No.: 18/261,087

(22) PCT Filed: Feb. 12, 2021

(86) PCT No.: PCT/CN2021/076635
§ 371 (c)(1),
(2) Date: Jul. 11, 2023

(87) PCT Pub. No.: WO2022/170624
PCT Pub. Date: Aug. 18, 2022

(65) Prior Publication Data
US 2024/0324018 A1 Sep. 26, 2024

(51) Int. Cl.
*H04B 7/06* (2006.01)
*H04W 74/0833* (2024.01)

(52) U.S. Cl.
CPC ....... *H04B 7/06952* (2023.05); *H04B 7/0617* (2013.01); *H04B 7/0626* (2013.01); *H04W 74/0833* (2013.01)

(58) Field of Classification Search
CPC .............. H04B 7/06952; H04B 7/0617; H04B 7/0626; H04B 7/06958; H04W 74/0833;
(Continued)

(56) References Cited

U.S. PATENT DOCUMENTS

| 2003/0045289 A1* | 3/2003 | Zhao ................. H04B 7/18539 |
| | | 455/12.1 |
| 2016/0192358 A1 | 6/2016 | Lee et al. |

(Continued)

FOREIGN PATENT DOCUMENTS

| CN | 108809585 A | 11/2018 |
| CN | 109792660 A | 5/2019 |

(Continued)

OTHER PUBLICATIONS

CAICT: "Discussion on Beam Management of NTN," 3GPP TSG RAN WG1#102-e, R1-2006858, e-Meeting, Aug. 17-28, 2020, (Aug. 28, 2020), the whole document, 3 pages.
(Continued)

*Primary Examiner* — Thai Nguyen
(74) *Attorney, Agent, or Firm* — Patterson + Sheridan, L.L.P.

(57) ABSTRACT

Certain aspects of the present disclosure provide techniques for beam selection for random access. A method that may be performed by a user equipment (UE) includes receiving, from a network entity, via a first beam, system information associated with at least a first plurality of beams that are within a coverage area of the first beam. The method also includes selecting a second beam among at least the first plurality of beams based at least in part on the system
(Continued)

700

702
Receive, from a network entity, via a first beam, system information associated with at least a first plurality of beams that are within a coverage area of the first beam 704
Select a second beam among at least the first plurality of beams based at least in part on the system information 706
Perform a random access procedure via the selected second beam information and performing a random access procedure via the selected second beam.

29 Claims, 13 Drawing Sheets

(58) Field of Classification Search
CPC . H04W 72/0453; H04W 74/08; H04W 24/10; H04L 5/001; H04L 5/0023; H04L 5/005; H04L 5/0051; H04L 5/0094
See application file for complete search history.

(56) References Cited

U.S. PATENT DOCUMENTS

| | | | |
|---|---|---|---|
| 2017/0180038 A1* | 6/2017 | Oza | H04B 7/18513 |
| 2018/0206178 A1 | 7/2018 | Tenny et al. | |
| 2019/0029036 A1 | 1/2019 | John Wilson et al. | |
| 2019/0052344 A1* | 2/2019 | Kundargi | H04B 17/24 |
| 2019/0208549 A1 | 7/2019 | Zhang et al. | |
| 2020/0084680 A1* | 3/2020 | Deenoo | H04W 36/0094 |
| 2020/0162198 A1* | 5/2020 | Seo | H04L 5/0053 |
| 2020/0314913 A1* | 10/2020 | Rastegardoost | H04W 56/0045 |
| 2022/0078848 A1* | 3/2022 | Hu | H04B 7/0695 |

FOREIGN PATENT DOCUMENTS

| | | | | |
|---|---|---|---|---|
| EP | 3923485 A1 * | 12/2021 | | H04W 72/542 |
| WO | 2016086144 A1 | 6/2016 | | |
| WO | 2020154666 A1 | 7/2020 | | |

OTHER PUBLICATIONS

International Search Report and Written Opinion—PCT/CN2021/076635—ISA/EPO—Oct. 26, 2021.

Samsung: "Additional Enhancements for Multi-Beam," 3GPP TSG RAN WG1 #104-e, R1-2101193, e-Meeting, Jan. 25-Feb. 5, 2021, (May 2, 2021), the whole document, 5 pages.

Supplementary European Search Report —EP21925281—Search Authority —The Hague —Oct. 14, 2024.

* cited by examiner

700

702

Receive, from a network entity, via a first beam, system information associated with at least a first plurality of beams that are within a coverage area of the first beam

704

Select a second beam among at least the first plurality of beams based at least in part on the system information

706

Perform a random access procedure via the selected second beam

800

802

Transmit, via a first beam, system information associated with at least a first plurality of beams that are within a coverage area of the first beam

804

Perform a random access procedure with a user equipment (UE) via at least one of the first plurality of beams

900

902

Receive, via a first beam, an indication of whether a beam or a bandwidth part (BWP) of a beam is barred for uplink transmission

904

Perform a random access procedure via the first beam or a second beam based at least in part on the indication

1000

1002

Transmit, via a first beam, system information comprising an indication of whether a beam or a bandwidth part (BWP) of a beam is barred for uplink transmission

1004

Perform a random access procedure, with a user equipment (UE), via the first beam or a second beam based at least in part on the indication

BEAM SELECTION FOR RANDOM ACCESS IN A HIERARCHICAL BEAM ARCHITECTURE

CROSS-REFERENCE TO RELATED APPLICATION(S)

This application is a national stage application under 35 U.S.C. 371 of PCT/CN2021/076635, filed Feb. 12, 2021, which is hereby expressly incorporated by reference herein in its entirety as if fully set forth below and for all applicable purposes.

BACKGROUND

Field of the Disclosure

Aspects of the present disclosure relate to wireless communications, and more particularly, to techniques for random access.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

As the demand for mobile broadband access continues to increase, there exists a need for further improvements in NR and LTE technology. These improvements should be applicable to other multi-access technologies and the telecommunication standards that employ these technologies.

SUMMARY

The systems, methods, and devices of the disclosure each have several aspects, no single one of which is solely responsible for its desirable attributes. After considering this discussion, and particularly after reading the section entitled "Detailed Description" one will understand how the features of this disclosure provide advantages that include desirable capacity and/or channel quality for random access.

Certain aspects of the subject matter described in this disclosure can be implemented in a method for wireless communication by a user equipment (UE). The method generally includes receiving, from a network entity, via a first beam, system information associated with at least a first plurality of beams that are within a coverage area of the first beam. The method also includes selecting a second beam among at least the first plurality of beams based at least in part on the system information and performing a random access procedure via the selected second beam.

Certain aspects of the subject matter described in this disclosure can be implemented in a method for wireless communication by a network entity. The method generally includes transmitting, via a first beam, system information associated with at least a first plurality of beams that are within a coverage area of the first beam. The method further includes performing a random access procedure with a UE via at least one of the first plurality of beams.

Certain aspects of the subject matter described in this disclosure can be implemented in a method for wireless communication by a UE. The method generally includes receiving, via a first beam, an indication of whether a beam or a bandwidth part (BWP) of a beam is barred for uplink transmission. The method also includes performing a random access procedure via the first beam or a second beam based at least in part on the indication.

Certain aspects of the subject matter described in this disclosure can be implemented in a method for wireless communication by a network entity. The method generally includes transmitting, via a first beam, an indication of whether a beam or a BWP of a beam is barred for uplink transmission. The method further includes performing a random access procedure, with a UE, via the first beam or a second beam based at least in part on the indication.

Aspects of the present disclosure provide means for, apparatus, processors (e.g., coupled to memory), and computer-readable mediums for performing the methods described herein.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain aspects of this disclosure and the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
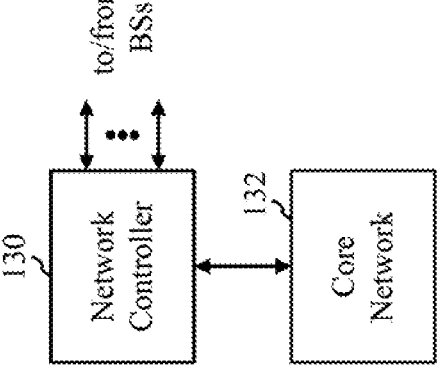
FIG. 1 is a block diagram conceptually illustrating an example wireless communication network, in accordance with certain aspects of the present disclosure.

Aspects of the present disclosure provide apparatus, methods, processing systems, and computer readable mediums for selecting a beam among multiple beams for random access. In certain aspects, the beam selection may be based on measures of channel quality associated with the beams and/or a UE's proximity to a beam's position (e.g., a global position of the beam). As an example, a UE may receive system information on a first beam, where the system information provides information associated with a set of other beams, such as a reference signal resource indicator or identifier, a random access channel (RACH) configuration, a downlink bandwidth part (BWP), and/or an uplink BWP for each of the other beams. The UE may monitor the reference signals associated with each of the other beams and select the beam with the best channel quality (e.g., the beam with the highest reference signal received power (RSRP)) for random access.

In certain aspects, the first beam is a wide beam and each beam of the set of other beams is a narrow beam. In certain aspects, one or more of the set of other beams is a narrow beam within a coverage area of the wide beam. In certain aspects, one or more additional beams of the set of other beams is a narrow beam within a coverage area of a second wide beam that covers a coverage area neighboring or adjacent to the wide beam. Accordingly, in certain aspects, a wide beam carries system information for one or more narrow beams. Though certain aspects herein may be described with respect to wide beams and narrow beams within a coverage area of wide beams, the aspects herein may also apply to any suitable beams, where one beam carries system information for one or more other beams.

The beam selection described herein may enable desirable capacity for random access due to the capacity being distributed across multiple beams. The beam selection described herein may enable desirable channel quality for random access, for example, due to the other beams being associated with separate BWPs, which may be dedicated for random access transmissions and/or separate from the BWP of the first beam. In other words, the beams for random access may reduce or prevent interference from random access communications on neighboring or adjacent beams.

The following description provides examples of random access in communication systems. Changes may be made in the function and arrangement of elements discussed without departing from the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs.

The techniques described herein may be used for various wireless networks and radio technologies. While aspects may be described herein using terminology commonly associated with 3G, 4G, and/or new radio (e.g., 5G NR) wireless technologies, aspects of the present disclosure can be applied in other generation-based communication systems.

NR access may support various wireless communication services, such as enhanced mobile broadband (eMBB) targeting wide bandwidth, millimeter wave mmW, massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QOS) requirements. In addition, these services may co-exist in the same subframe.

The electromagnetic spectrum is often subdivided, based on frequency/wavelength, into various classes, bands, channels, etc. In 5G NR two initial operating bands have been identified as frequency range designations FR1 (410 MHz-7.125 GHZ) and FR2 (24.25 GHz-52.6 GHz). The frequencies between FR1 and FR2 are often referred to as mid-band frequencies. Although a portion of FR1 is greater than 6 GHZ, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHZ, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

NR supports beamforming and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

FIG. 1 illustrates an example wireless communication network 100 in which aspects of the present disclosure may be performed. For example, the wireless communication network 100 may be an NR system (e.g., a 5G NR network). As shown in FIG. 1, the wireless communication network 100 may be in communication with a core network 132. The core network 132 may in communication with one or more base station (BSs) 110a-z (each also individually referred to herein as BS 110 or collectively as BSs 110) and/or user equipment (UE) 120a-y (each also individually referred to herein as UE 120 or collectively as UEs 120) in the wireless communication network 100 via one or more interfaces.

As shown in FIG. 1, the BS 110a includes a random access (RA) manager 112 that transmits system information associated with selecting a beam among one or more sets of beams and/or transmits a beam/BWP-specific barring bit, in accordance with aspects of the present disclosure. The UE 120a includes an RA manager 122 that selects a beam among the set of beams indicated in the system information for random access and/or performs an RA procedure based on the barring bit, in accordance with aspects of the present disclosure.

A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple cells.

The BSs 110 communicate with UEs 120 in the wireless communication network 100. The UEs 120 (e.g., 120x, 120y, etc.) may be dispersed throughout the wireless communication network 100, and each UE 120 may be stationary or mobile. Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

A network controller 130 may be in communication with a set of BSs 110 and provide coordination and control for these BSs 110 (e.g., via a backhaul). In certain cases, the network controller 130 may include a centralized unit (CU) and/or a distributed unit (DU), for example, in a 5G NR system. In aspects, the network controller 130 may be in communication with a core network 132 (e.g., a 5G Core Network (5GC)), which provides various network functions such as Access and Mobility Management, Session Management, User Plane Function, Policy Control Function, Authentication Server Function, Unified Data Management, Application Function, Network Exposure Function, Network Repository Function, Network Slice Selection Function, etc.

Figure 2:
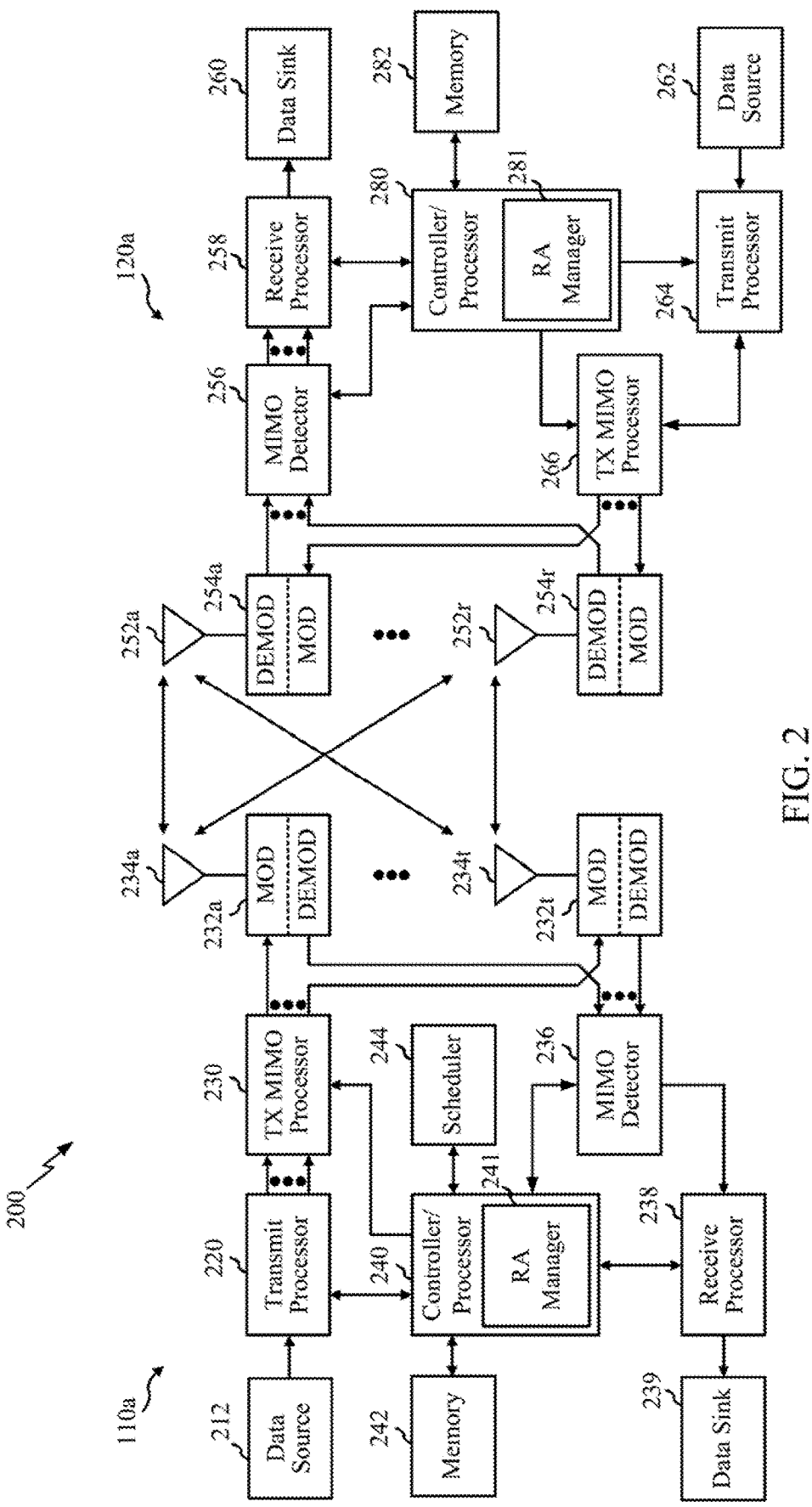
FIG. 2 is a block diagram conceptually illustrating a design of an example a base station (BS) and user equipment (UE), in accordance with certain aspects of the present disclosure.

FIG. 2 illustrates example components of BS 110a and UE 120a (e.g., the wireless communication network 100 of FIG. 1), which may be used to implement aspects of the present disclosure.

At the BS 110a, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), PBCH demodulation reference signal (DMRS), and channel state information reference signal (CSI-RS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232a-232t. Each modulator in transceivers 232a-232t may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from the modulators in transceivers 232a-232t may be transmitted via the antennas 234a-234t, respectively.

At the UE 120a, the antennas 252a-252r may receive the downlink signals from the BS 110a and may provide received signals to the demodulators (DEMODs) in transceivers 254a-254r, respectively. Each demodulator in transceivers 254a-254r may condition (e.g., filter, amplify, down-convert, and digitize) a respective received signal to obtain input samples. Each demodulator may further process the input samples (e.g., for OFDM, etc.) to obtain received symbols. A MIMO detector 256 may obtain received symbols from all the demodulators in transceivers 254a-254r, perform MIMO detection on the received symbols if applicable, and provide detected symbols. A receive processor 258 may process (e.g., demodulate, deinterleave, and decode) the detected symbols, provide decoded data for the UE 120a to a data sink 260, and provide decoded control information to a controller/processor 280.

On the uplink, at UE 120a, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254a-254r (e.g., for SC-FDM, etc.), and transmitted to the BS 110a. At the BS 110a, the uplink signals from the UE 120a may be received by the antennas 234, processed by the demodulators in transceivers 232a-232t, detected by a MIMO detector 236 if applicable, and further processed by a receive processor 238 to obtain decoded data and control information sent by the UE 120a. The receive processor 238 may provide the decoded data to a data sink 239 and the decoded control information to the controller/processor 240.

The memories 242 and 282 may store data and program codes for BS 110a and UE 120a, respectively. A scheduler 244 may schedule UEs for data transmission on the downlink and/or uplink.

Antennas 252, processors 266, 258, 264, and/or controller/processor 280 of the UE 120a and/or antennas 234, processors 220, 230, 238, and/or controller/processor 240 of the BS 110a may be used to perform the various techniques and methods described herein. For example, as shown in FIG. 2, the controller/processor 240 of the BS 110a has an RA manager 241 that transmits system information associated with selecting a beam among one or more sets of beams and/or transmits a beam/BWP-specific barring bit, according to aspects described herein. As shown in FIG. 2, the controller/processor 280 of the UE 120a has an RA manager 281 that selects a beam among the set of beams indicated in the system information for random access and/or performs an RA procedure based on the barring bit, according to aspects described herein. Although shown at the controller/processor, other components of the UE 120a and BS 110a may be used to perform the operations described herein.

While the UE 120a is described with respect to FIGS. 1 and 2 as communicating with a BS and/or within a network, the UE 120a may be configured to communicate directly with/transmit directly to another UE 120, or with/to another wireless device without relaying communications through a network. In some embodiments, the BS 110a illustrated in FIG. 2 and described above is an example of another UE 120.

NR may utilize orthogonal frequency division multiplexing (OFDM) with a cyclic prefix (CP) on the uplink and downlink. NR may support half-duplex operation using time division duplexing (TDD). OFDM and single-carrier frequency division multiplexing (SC-FDM) partition the system bandwidth into multiple orthogonal subcarriers, which are also commonly referred to as tones, bins, etc. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, etc.).

Figure 3:
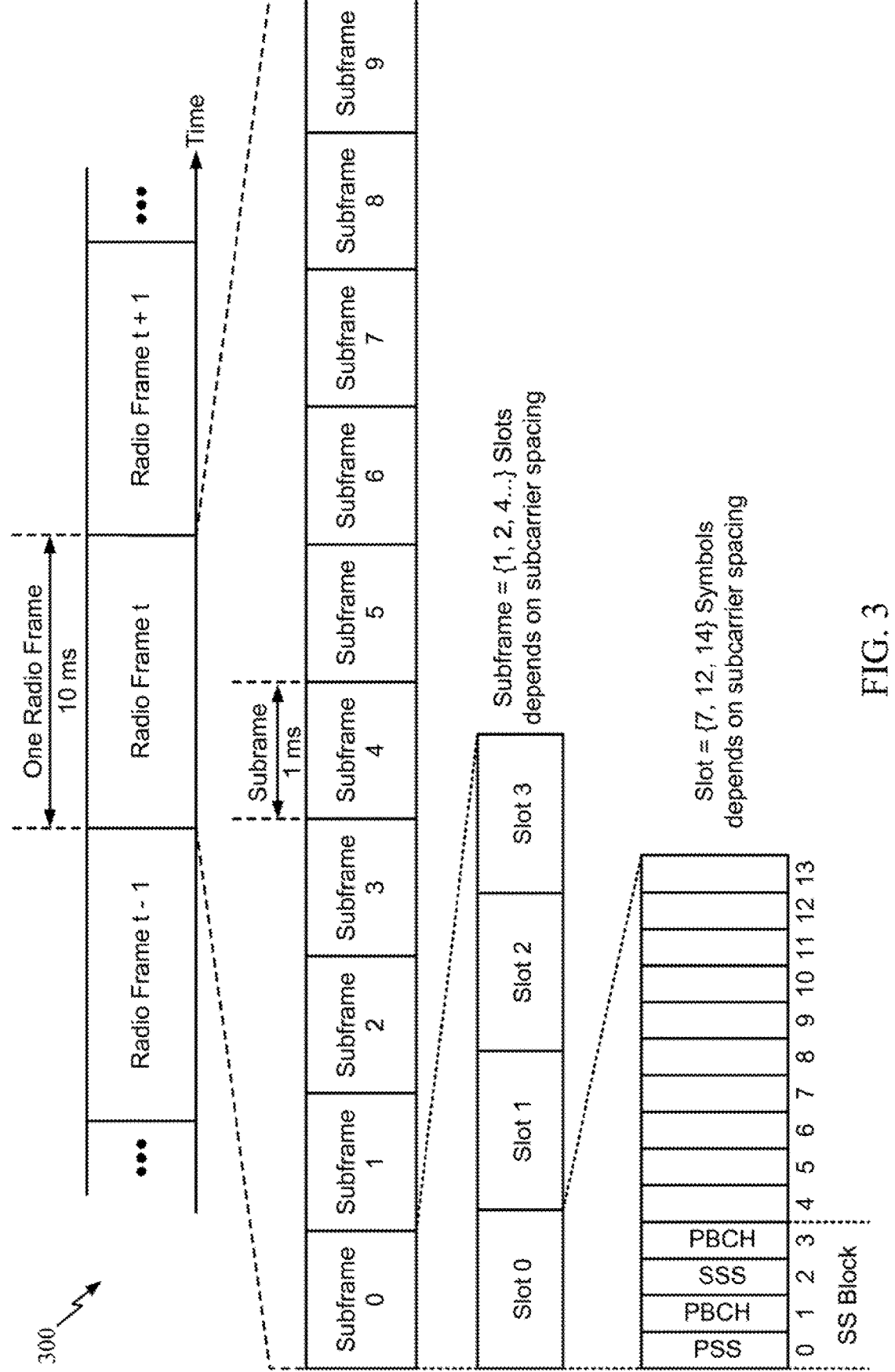
FIG. 3 is an example frame format for certain wireless communication systems (e.g., new radio (NR)), in accordance with certain aspects of the present disclosure.

FIG. 3 is a diagram showing an example of a frame format 300 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots (e.g., 1, 2, 4, 8, 16, . . . slots) depending on the SCS. Each slot may include a variable number of symbol periods (e.g., 7, 12, or 14 symbols) depending on the SCS. The symbol periods in each slot may be assigned indices. A sub-slot structure may refer to a transmit time interval having a duration less than a slot (e.g., 2, 3, or 4 symbols). Each symbol in a slot may be configured for a link direction (e.g., downlink (DL), uplink (UL), or flexible) for data transmission and the link direction for each subframe may be dynamically switched. The link directions may be based on the slot format. Each slot may include DL/UL data as well as DL/UL control information.

In NR, a synchronization signal block (SSB) is transmitted. In certain aspects, SSBs may be transmitted in a burst where each SSB in the burst corresponds to a different beam direction for UE-side beam management (e.g., including beam selection and/or beam refinement). The SSB includes a PSS, a SSS, and a two symbol PBCH. The SSB can be transmitted in a fixed slot location, such as the symbols 0-3 as shown in FIG. 3. The PSS and SSS may be used by UEs for cell search and acquisition. The PSS may provide half-frame timing, the SSS may provide the CP length and frame timing. The PSS and SSS may provide the cell identity. The PBCH carries some basic system information, such as downlink system bandwidth, timing information within radio frame, SS burst periodicity, system frame number, etc. The SSBs may be organized into an SS burst to support beam sweeping. Further system information such as, remaining minimum system information (RMSI), system information blocks (SIBs), other system information (OSI) can be transmitted on a physical downlink shared channel (PDSCH) in certain subframes. The SSB can be transmitted up to sixty-four times within an SS burst, for example, with up to sixty-four different beam directions for mm Wave. The multiple transmissions of the SSB are referred to as an SS burst in a half radio frame. SSBs in an SS burst may be transmitted in the same frequency region, while SSBs in different SS bursts can be transmitted at different frequency regions.

Example Non-Terrestrial Network

Figure 4:
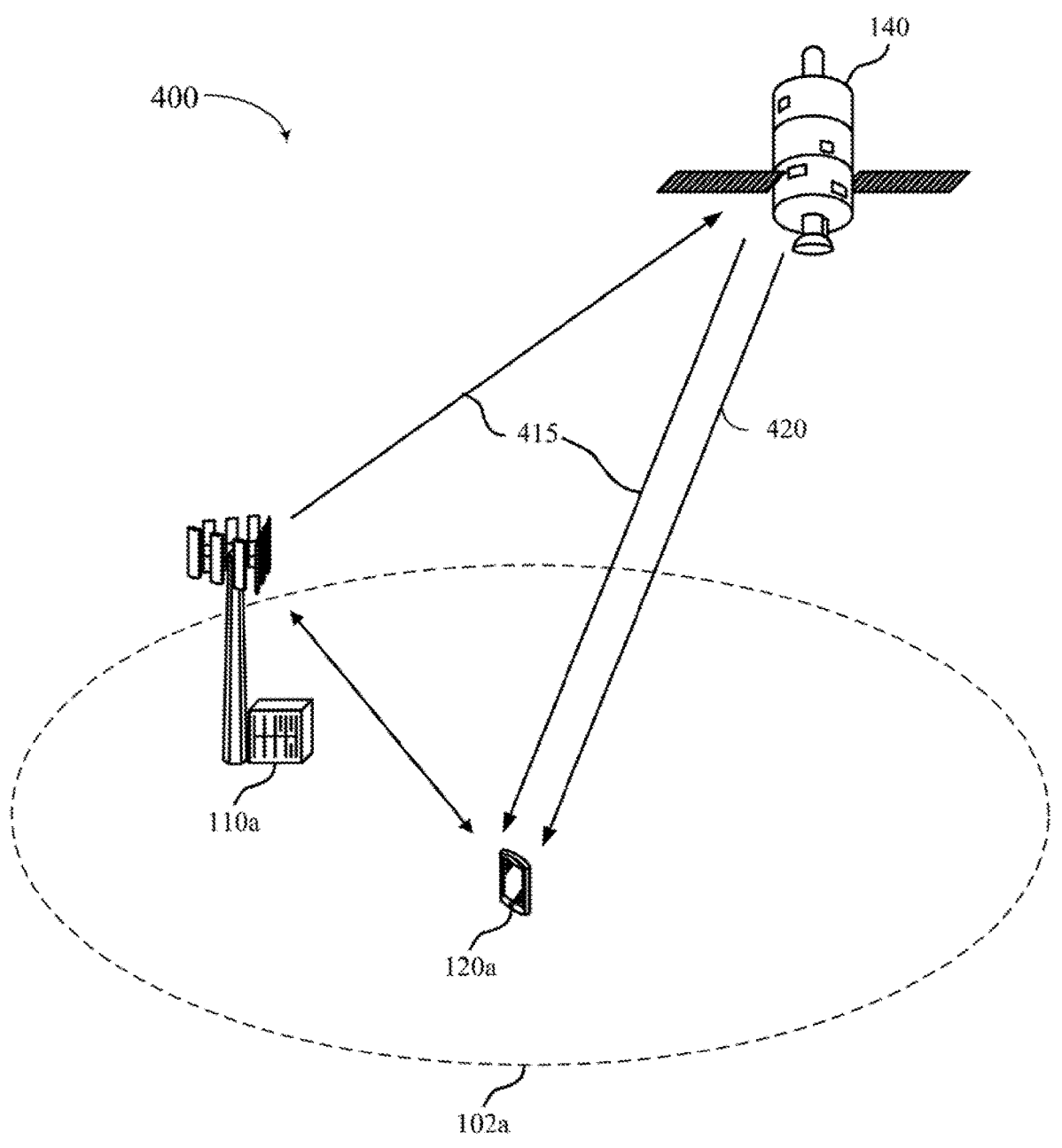
FIG. 4 is a diagram illustrating an example wireless communication network having a non-terrestrial network entity, in accordance with certain aspects of the present disclosure.

FIG. 4 illustrates an example of a wireless communications network 500 including a satellite 140, in accordance with aspects of the present disclosure. In some examples, the wireless communications network 500 may implement aspects of the wireless communication network 100. For example, the wireless communications network 500 may include BS 110a, UE 120a, and non-terrestrial network entity 140. BS 110a may serve a coverage area or cell 102a in cases of a terrestrial network, and non-terrestrial network entity 140 may serve the coverage area 102a in cases of a non-terrestrial network (NTN). Some NTNs may employ airborne platforms (e.g., a drone or balloon) and/or space-borne platforms (e.g., a satellite).

The satellite 140 may communicate with the BS 110a and UE 120a as part of wireless communications in an NTN. In cases of a terrestrial network, the UE 120a may communicate with the BS 110a over a communication link. In the case of NTN wireless communications, the satellite 140 may be the serving cell for the UE 120a. In certain aspects, the satellite 140 may act as a relay for the BS 110a and the UE 120a, relaying both data transmission and control signaling 415.

The satellite 140 may orbit the earth's surface at a particular altitude. The distance between the satellite 140 and UE 120a may be much greater than the distance between BS 110a and UE 120a. The distance between the UE 120a and the satellite 140 may cause an increased round-trip delay (RTD) in communications between the UE 120a and the satellite 140. The motion of the satellite 140 may cause a Doppler effect and contribute to a frequency shift in communications between the UE 120a and the satellite 140. The frequency shift may be also contributed to by error related to the local oscillation of either the UE 120a or the satellite 140. The RTD and frequency shift associated with communications in NTNs may lead to inefficiency in transmissions, latency, and inability to accurately transmit and receive messages.

Figure 6A:
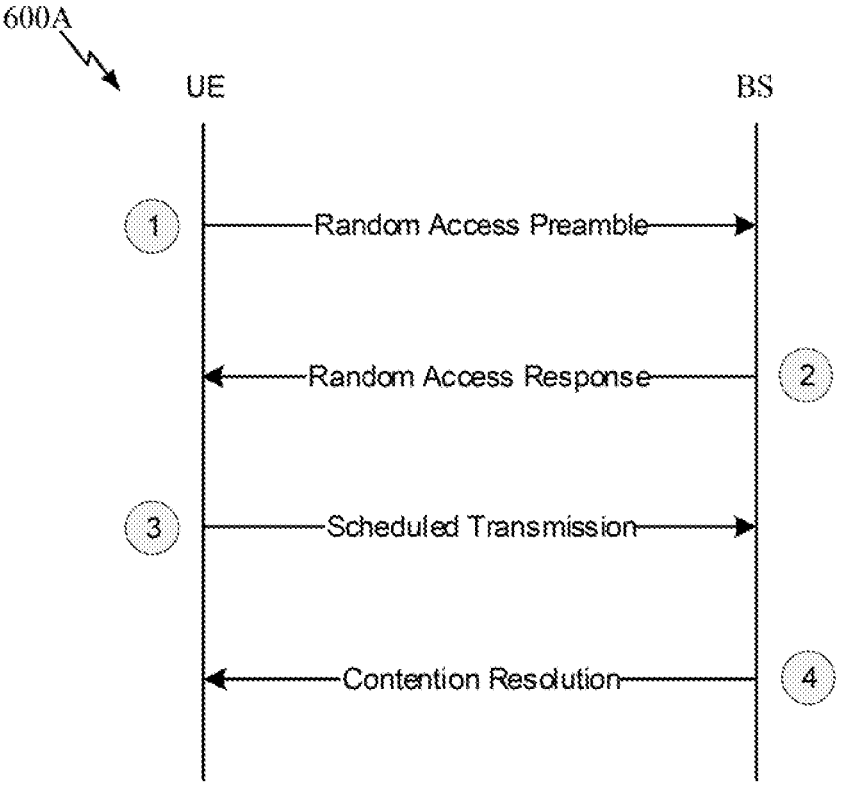
FIGS. 6A and 6B are signaling flow diagrams of example random access procedures, in accordance with certain aspects of the present disclosure.
Figure 6B:
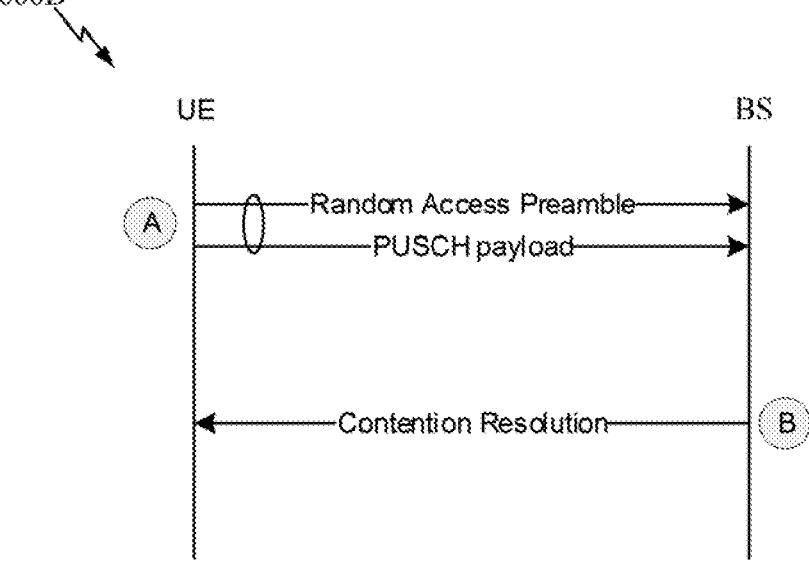

The UE 120a may determine to connect to the satellite 140 using a random access (RA) procedure (e.g., a four-step RA procedure or a two-step RA procedure as further described herein with respect to FIGS. 6A and 6B). The initiation of the RA procedure may begin with the transmission of a RA preamble (e.g., an NR preamble for RA) by the UE 120a to the satellite 140 or BS 110a. The UE 120a may transmit the RA preamble on a physical random access channel (PRACH). In some PRACH designs, there may be no estimation or accounting for the RTD or the frequency shift associated with NTNs. In certain networks, such as terrestrial NR networks (e.g., 5G NR), SSBs transmitted by a cell are transmitted on the same frequency interval (e.g., occupying the same frequency interval). In NTN, a satellite may use multiple antennas to form multiple narrow beams and the beams may operate on different frequency intervals to mitigate interference among the beams.

Figure 5:
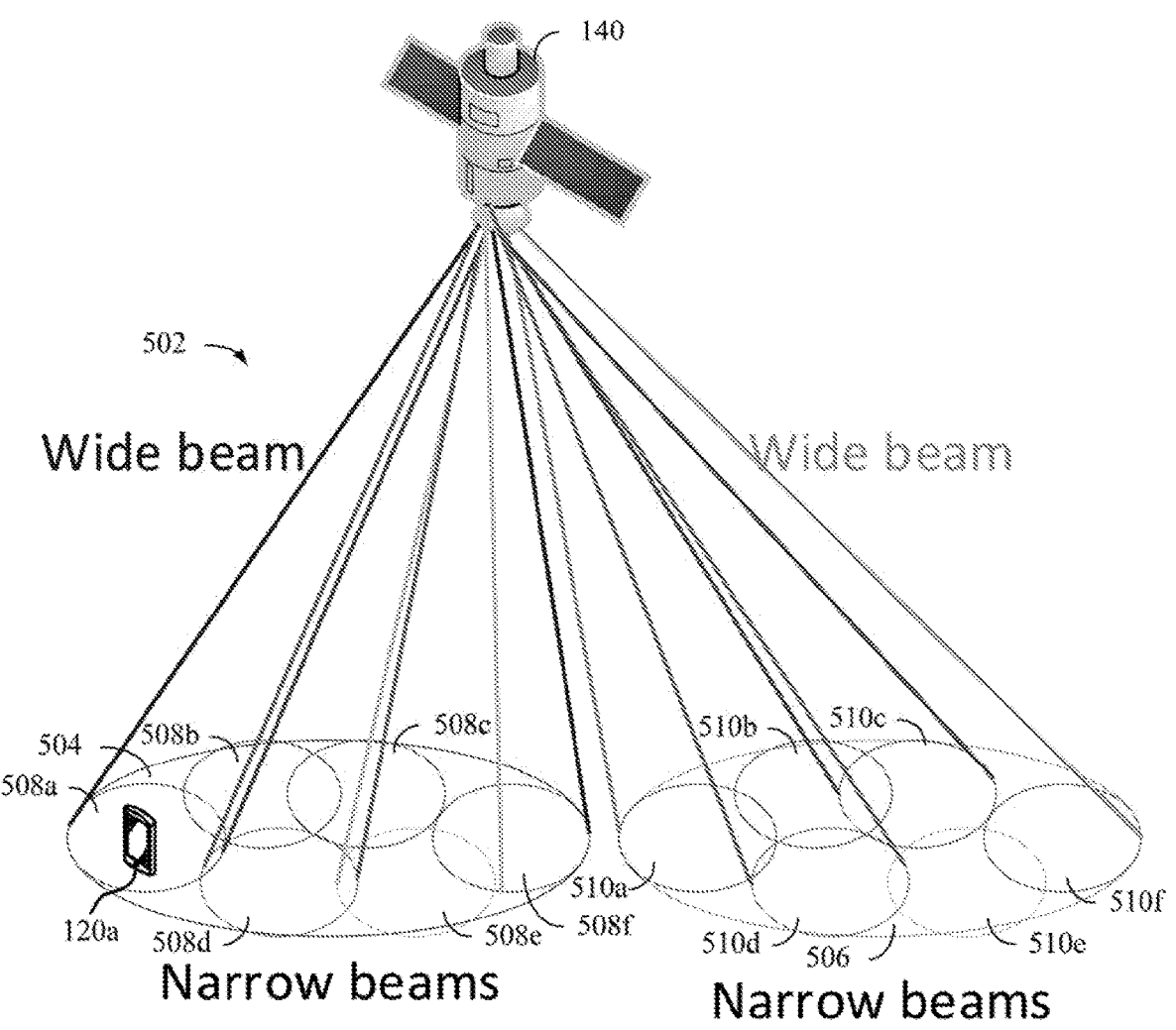
FIG. 5 is a diagram illustrating an example beam architecture for a network entity, such as the non-terrestrial network entity of FIG. 4, in accordance with certain aspects of the present disclosure.

FIG. 5 illustrates an example beam architecture for a network entity, such as the satellite 140, in accordance with certain aspects of the present disclosure. As shown, the satellite 140 may communicate via a plurality of beams 502 including a first wide beam 504 and a second wide beam 506. The beams 502 may also include a first plurality of narrow beams (508a-f) and a second plurality of narrow beams (510a-f). The first plurality of narrow beams 508a-f may be within a coverage area of the first wide beam 504, and the second plurality of narrow beam 510a-f may be within a coverage area of the second wide beam 506. The first wide beam 504 may overlap with the first plurality of narrow beams 508a-f. Expressed another way, each of the first plurality of narrow beams 508a-f may have a narrower beam width than the first wide beam 504. In this example, the UE 120a may be located in the coverage area of the first wide beam 504 and the narrow beam 508a, and the UE 120a may communicate with the satellite 140 via the first wide beam 504 and/or the narrow beam 508a.

In various scenarios, a UE may communicate with a network entity (such as a base station) via an RA procedure. For example, the UE may use an RA procedure for initial radio resource control (RRC) connection setup, RRC connection re-establishment, a handover scenario, a scheduling request failure, beam recovery, downlink or uplink data arrival, etc. FIG. 6A illustrates an example four-step RA procedure 600A, in accordance with certain aspects of the present disclosure. In a first message (MSG1), the UE transmits a RA preamble to the BS. The UE may monitor for a response from the BS within a configured window. The UE may receive the random access response (RAR) from the BS, where the RAR may include uplink scheduling for the UE. Upon reception of the RAR, the UE sends a third message (MSG3) using the uplink grant scheduled in the response and monitors for contention resolution. If contention resolution is not successful after MSG3 (re)transmission(s), the UE may go back to MSG1 transmission.

FIG. 6B illustrates an example two-step RA procedure 600B, in accordance with certain aspects of the present disclosure. The UE may transmit in a first message (MSGA) including a preamble on a PRACH and a payload on a PUSCH. After the MSGA transmission, the UE monitors for a response from the BS within a configured window. If contention resolution is successful upon receiving the network response (MSGB), the UE ends the random access procedure; while if a fallback indication is received in MSGB, the UE may perform MSG3 transmission using the UL grant scheduled in the fallback indication and monitors contention resolution. If contention resolution is not successful after MSG3 (re)transmission(s), the UE may go back to the MSGA transmission. FIGS. 6A and 6B illustrate examples of contention-based random access (CBRA) procedures to facilitate understanding. Aspects of the present disclosure may also apply to contention-free random access (CFRA) procedures, where the network may initially provide a RA preamble and/or uplink resource assignment to the UE.

Certain wireless communication networks (e.g., an NTN) may adopt a hierarchical beam architecture. For example, the wide beams of FIG. 5 may be reserved for time and frequency synchronization, transmission of system information, and random access, whereas the narrow beams may be used for uplink and/or downlink data transmissions. Such a beam architecture may simplify the handling of mobility. For example, beam switching may be used instead of handover in the case where each beam is configured as a separate cell. If a wide beam covers all the narrow beams in a cell, the link budget may not scale with the number of narrow beams, which could number in the hundreds for an NTN. The wide beam may operate with a very high transmit power to have similar link budget as the narrow beams, and the high transmit power may cause elevated interference to narrow beams. The antenna gain of receive antenna for the wide beam may be small, leading to insufficient link budget for the uplink transmissions from the UEs. Also, the wide beam may provide insufficient capacity for random access, for example, due to UEs overloading the RACH on the wide beam.

Example Beam Selection for Random Access

Aspects of the present disclosure provide apparatus, methods, processing systems, and computer readable mediums for selecting a beam among multiple beams for random access. In certain aspects, the beam selection may be based on measures of channel quality associated with the beams and/or a UE's proximity to a beam's position (e.g., a global position of the beam). As an example, a UE may receive system information on a first beam (e.g., the first wide beam 504), where the system information provides information associated with a set of other beams (e.g., the first plurality of narrow beams 508a-f), such as a reference signal resource indicator or identifier, a RACH configuration, a downlink bandwidth part (BWP), and/or an uplink BWP for each of the other beams. The UE may monitor the reference signals associated with each of the other beams and select the beam with the best channel quality (e.g., the beam with the highest reference signal received power (RSRP)) for random access. The UE may receive system information about narrow beams via the wide beam.

The beam selection described herein may enable desirable capacity for random access due to the capacity being distributed across multiple beams. The beam selection described herein may enable desirable channel quality for random access, for example, due to the narrow beams being associated with separate BWPs, which may be dedicated for random access transmissions and/or separate from the BWP of the wide beam. In other words, the beams for random access may reduce or prevent interference from random access communications on neighboring or adjacent beams.

Figure 7:
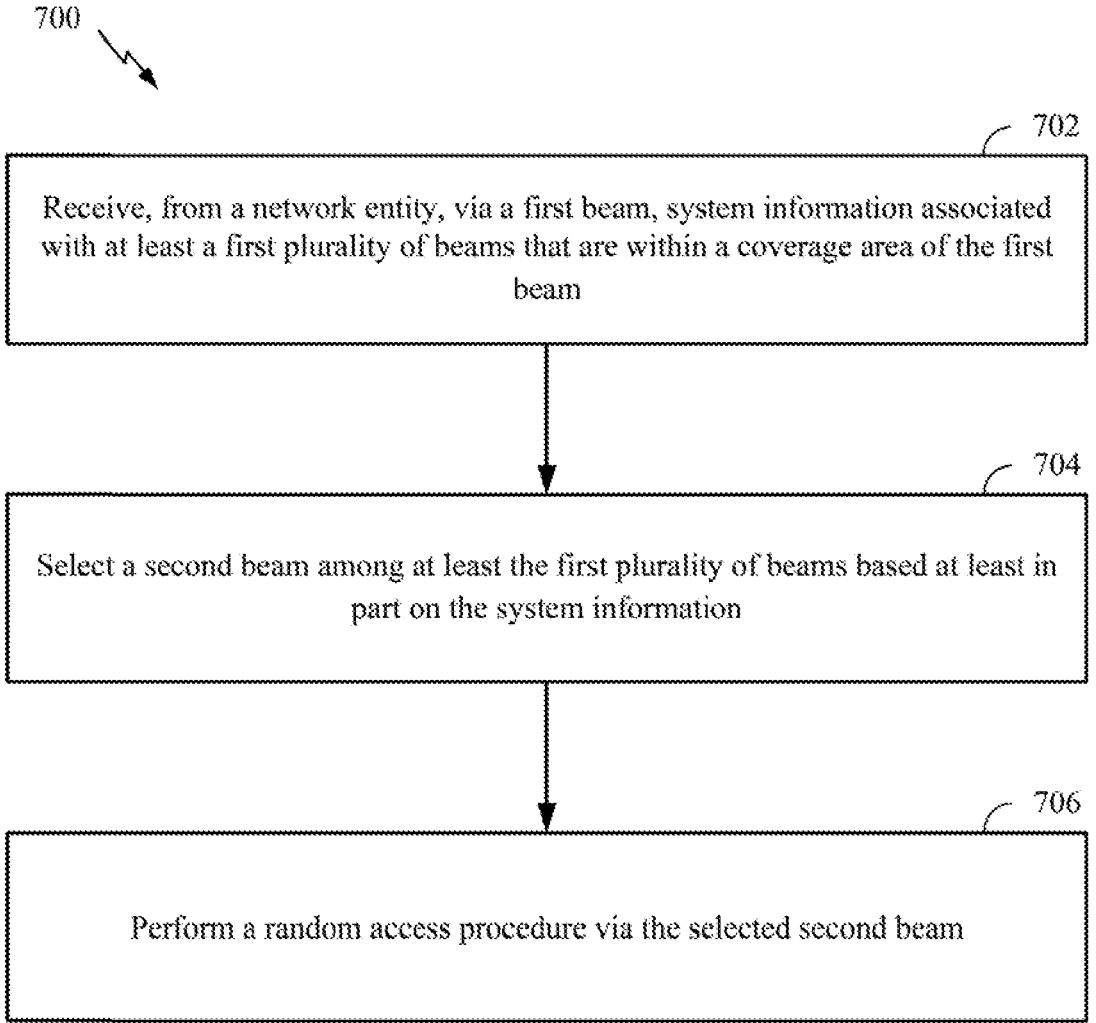
FIG. 7 is a flow diagram illustrating example operations for wireless communication by a UE, in accordance with certain aspects of the present disclosure.

FIG. 7 is a flow diagram illustrating example operations 700 for wireless communication, in accordance with certain aspects of the present disclosure. The operations 700 may be performed, for example, by a UE (such as the UE 120a in the wireless communication network 100). The operations 700 may be implemented as software components that are executed and run on one or more processors (e.g., controller/processor 280 of FIG. 2). Further, the transmission and reception of signals by the UE in operations 700 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals. As used herein, a network entity may refer to a terrestrial and/or non-terrestrial wireless communication device, such as a base station, network controller, spaceborne platform (e.g., a satellite), and/or airborne platform.

The operations 700 may begin, at block 702, where the UE may receive, from a network entity (e.g., the BS 110a and/or the satellite 140), via a first beam (e.g., the first wide beam 504), system information associated with at least a first plurality of beams (e.g., the first plurality of narrow beams 508a-f) that are within a coverage area of the first beam. For example, the system information may include information for selecting a beam for RA as well as information for performing an RA procedure as further described herein.

At block 704, the UE may select a second beam (e.g., the narrow beam 508a) among at least the first plurality of beams based at least in part on the system information. As an example, the UE may be located in the coverage area of the narrow beam 508a, which may result in an RSRP that is higher for that particular beam than the RSRPs for the other beams 508b-f. The UE may select the narrow beam 508a as the second beam for the operations 700 based on the narrow beam 508a having the highest RSRP among the other beams

508b-f indicated in the system information. The UE may select a narrow beam (identified by a CSI-RS resource indicator (CRI) in the system information) based on the RSRP measurements on the CSI-RS's of narrow beams and/or the UE's proximity to the beam centers of the narrow beams, for example. In certain aspects, beams associated with a neighboring wide beam (e.g., the second plurality of narrow beams 510a-f associated with the second wide beam 506) may also be indicated in the system information and available for selection at block 704.

At block 706, the UE may perform a random access procedure via the selected second beam. For example, the UE may perform the four-step RA procedure as described herein with respect to FIG. 6A. Additionally, or alternatively, the UE may perform the two-step RA procedure as described herein with respect to FIG. 6B. The UE may perform random access on the BWPs associated with the selected narrow beam. The UE may initiate the random access by transmitting a MSG1 (four-step RA) or a MSGA (two-step RS) on the uplink BWP associated with the selected narrow beam.

The system information at block 702 may include various information for selecting a beam for RA and/or performing an RA procedure. In certain aspects, the system information may include an identifier for each of the narrow beams (such as a reference signal resource indicator or identifier), a CSI-RS configuration for each of the narrow beams, a beam center location (e.g., global position coordinates) of each of the narrow beams, a RACH configuration (e.g., RACH occasions and preambles) for each of the narrow beams, and/or a downlink BWP and an uplink BWP associated with each of the narrow beams. In certain aspects, the downlink and uplink BWPs for a particular beam (e.g., the beam 508a) may be different from the downlink and uplink BWPs for the other beams (508b-f), for example, to reduce interference from adjacent narrow beams (e.g., beams 508b, 508d).

With respect to the operations 700, the system information may include a reference signal (RS) resource indicator for each of the first plurality of beams, a RACH configuration for each of the first plurality of beams, a downlink BWP configuration for each of the first plurality of beams, and an uplink BWP configuration for each of the first plurality of beams. The RS resource indicator may include a CSI-RS resource indicator (CRI) among a set of CSI-RS resources. The RS resource indicator may include a particular RS resource identifier among a set of RS resources.

The RACH configuration may provide the beam specific random-access parameters used for performing the RA procedure at block 706. For example, the RACH configuration may include the RACH occasions, preambles for contention-based RA, the subcarrier spacing of the PRACH, the RAR (e.g., MSG2) window length (e.g., in terms of slots) for monitoring the RAR, initial value for the contention resolution timer (e.g., in terms of subframes), etc.

The downlink and uplink BWP configurations may include parameters of a BWP. For example, a BWP configuration may include a frequency domain location and bandwidth of a BWP, whether to use the extended cyclic prefix for the BWP, and/or a subcarrier spacing to be used in the BWP. In certain cases, the downlink and/or uplink BWP configurations may be indicated by a specific identifier (e.g., BWP identifier) associated with a particular BWP configuration, which may be configured by the network. That is, the system information may include an indication of a BWP configuration for each of the narrow beams, where the indication of the BWP configuration may be a BWP identifier associated with a particular BWP configuration.

In certain aspects, the system information may include specific information for selecting a beam for random access. With respect to the operations 700, the system information may include a global position (e.g., the Global Positioning System (GPS), GLObal NAvigation Satellite System (GLONASS), and/or Global Navigation Satellite System (GNSS) location(s)) indication for each of the first plurality of beams and/or a CSI-RS configuration for each of the first plurality of beams. The global position indication may include a latitude and longitude of a location associated with a particular beam, such as a center or centroid location of the beam. The CSI-RS resource configuration may include a Non-Zero-Power (NZP) CSI-RS configuration. For example, the CSI-RS resource configuration may include a periodicity and slot offset for a CSI-RS, a resource mapping (e.g., OFDM symbol location(s) in a slot and subcarrier occupancy in a physical resource block (PRB)), etc.

In aspects, the system information may be for one or more sets of beams. For certain aspects, the system information may be for the narrow beams associated with the wide beam. Referring to FIG. 5, the system information may be received on the first wide beam 504, and the system information may be associated with the first plurality of narrow beams 508*a-f*. Additionally, or alternatively, the system information may be for the narrow beams associated with a neighboring wide beam, which is adjacent to the wide beam carrying the system information. The identity of the wide beam (e.g., SSB index) may be indicated and associated with the first set of narrow beams in the system information. Referring to FIG. 5, the system information may be received on the first wide beam 504, and the system information may be for the second plurality of narrow beams 510*a-f*. The identity of the neighboring wide beam (e.g., SSB index) may be indicated and associated with the second set of narrow beams. With respect to the operations 700, the system information may be further associated with a second plurality of beams (e.g., the second plurality of narrow beams 510*a-f*) that are within a coverage area of a third beam (e.g., the second wide beam 506). At block 704, the UE may select the second beam among at least the first plurality of beams and the second plurality of beams.

At block 704, the UE may select the second beam based on one or more criteria. For example, the UE may select the second beam based on the channel quality of reference signals associated with the beams indicated in the system information. With respect to the operations 700, the UE may monitor reference signals associated with the first plurality of beams and/or the second plurality of beams as indicated in the system information. As described herein, the system information may include reference signal resource indicators associated with reference signals that are transmitted via the first plurality of beams and/or the second plurality of beams. At block 704, the UE may select the second beam further based at least in part on measurements of the reference signals derived from monitoring the reference signals. For example, the measurements of the reference signals may include a channel quality indicator (CQI), signal-to-noise ratio (SNR), signal-to-interference plus noise ratio (SINR), signal-to-noise plus distortion ratio (SNDR), a received signal strength indicator (RSSI), reference signal received quality (RSRQ), and/or RSRP for each of the reference signals. The UE may select the second beam with the best channel quality or signal quality (e.g., the highest RSRP) among the first plurality of beams and/or the second plurality of beams based on the measurements of the reference signals.

In certain aspects, the beam selection may be based at least in part on the proximity of the UE to the global position of the second beam. For example, the UE may select the beam that is the closest in distance to the UE. The position of the beams (such as a center or centroid position) may be indicated in the system information. With respect to the operations 700, the UE may determine distances from a position of the UE (e.g., a latitude and longitude of the UE) to positions of the first plurality of beams and/or the second plurality of beams as indicated in the system information. At block 704, the UE may select the second beam further based at least in part on the determined distances. For example, the second beam may be the beam that is closest in proximity to the UE among the other beams. That is, the selection of the second beam may be based on the second beam being associated with a shortest distance among at least the determined distances.

In certain aspects, there may be various cell architectures for the wide beam(s) and corresponding narrow beams from a network entity such as a satellite. For example, the first beam and the first plurality of beams may be configured as a single cell. That is, a single cell may be configured with the first beam and the first plurality of beams. For certain aspects, another wide beam and its corresponding narrow beams may be configured in that same cell. That is, all wide beams and narrow beams from a network entity (such as a satellite) may be configured as a single cell. As an example, the first beam, the first plurality of beams, the third beam, and the second plurality of beams may be configured as a single cell. In aspects, the wide beams and the respective associated narrow beams from a network entity (such as a satellite) may be configured as distinct cells. For example, the first beam and the first plurality of beams may be configured as a first cell, and the third beam and the second plurality of beams may be configured as a second cell.

In aspects, the UE may synchronize on the first beam before receiving the system information. For example, the UE may acquire time and/or frequency synchronization by detecting an SSB on a wide beam, and the narrow beams associated with a particular wide beam may be indicated by an SSB index associated with the wide beam. With respect to the operations 700, the UE may acquire at least one of time or frequency synchronization via an SSB on the first beam. The SSB may include various parameters for initial access in a PBCH, such as PDCCH configuration including a control resource set (CORESET) (e.g., ControlResourceSetZero) and a search space (e.g., SearchSpaceZero). The UE may receive scheduling information for the system information via the first beam based on information (e.g., a master information block (MIB)) indicated in the SSB, such as the PBCH of the SSB. For example, the MIB in the PBCH of the SSB may include the PDCCH configuration, and the UE may monitor the PDCCH for scheduling information associated with one or more SIBs. In aspects, the scheduling information may indicate transmission occasions for the system information on a PDSCH via the first beam. The UE may receive the system information (e.g., a SIB) based on the scheduling information at block 702. In aspects, the UE may identify the first beam and/or the third beam by an SSB index associated with the SSB, for example, as indicated by the PBCH of the SSB transmitted on the first beam and/or the third beam. In certain cases, PBCH scrambling sequences used for PBCH scrambling implicitly may indicate the SSB index associated with an SSB. The first beam and the first plurality of beams may be synchronized in time such that a UE that has acquired time synchronization with the first beam automatically acquires time synchronization with any beam among the first plurality of beams. In some aspects, acquiring time synchronization may mean acquiring the time of the starting point of a frame with a particular system frame number (SFN). The first beam and the first plurality of beams may be synchronized in frequency. In some aspects, the nominal frequency (e.g., the frequency indicated in the SIB) to the actual frequency ratio may be the same between the first beam and any one of the beams among the first plurality of beams.

In certain aspects, the UE may receive, from a network entity, an indication of whether a given beam or a BWP associated with the given beam is barred from communications, such as downlink communications, uplink communications, and/or RA communications. Such an indication may be referred to as a barring bit or barring indication. For example, the indication may be a bit flag (e.g., 1=not barred or 0=barred, and alternatively 0=not barred or 1=barred) or a particular state (e.g., barred or not barred) indicating that a beam or BWP is either barred or not barred. In certain cases, the network entity may transmit a beam/BWP barring bit based on the load of a PRACH in the MIB (e.g., the PBCH of an SSB) or a SIB. The beam that is barred or not barred may be indicated by an SSB index or another reference signal identifier. The BWP that is barred or not barred may be indicated by a BWP identifier associated with a particular BWP. In certain aspects, the BWP that is barred or not barred may be implicitly indicated, such as being associated with the initial BWP (e.g., where the BWP identifier=0). The UE may also receive a barring bit for neighboring beams or narrow beams. That is, additionally, or alternatively, a beam/BWP barring bit may be transmitted for a second beam/BWP (e.g., a neighboring wide beam). For certain aspects, the beam/BWP barring bit may be associated with two or more beams or BWPs, such as any two or more of the first wide beam 504, the second wide beam 506, the first plurality of narrow beams 508a-f, and/or the second plurality of narrow beams 510a-f.

In certain aspects, at block 704, the first beam and/or third beam may also be included in beams for selection based on the barring bit. For example, if the beam/BWP barring bit indicates that the first beam is not barred, the UE may default to using the first beam for random access or select a beam among the first beam and the first plurality of beams (e.g., the first plurality of narrow beams 508a-f) as described herein. Otherwise, if the beam/BWP barring bit indicates that the first beam is barred, the UE performs random access on a beam selected among the first plurality of beams as described herein. If a UE receives system information (e.g., SIB1) with a RACH configuration from the barred beam/ BWP, the UE may refrain from performing random access on the barred beam/BWP. With respect to the operations 700, the UE may receive an indication that the first beam or a BWP (e.g., an uplink BWP) of the first beam is barred for uplink transmission. For example, the UE may receive the indication via a MIB (e.g., in the PBCH of an SSB) or a SIB (e.g., on a PDSCH). At block 704, the UE may select the second beam and perform the random access procedure via the second beam in response to receiving the barring indication.

For certain aspects, the RA procedure at block 706 may be a four-step procedure, for example, as described herein with respect to FIG. 6A. For example, at block 706, the UE may transmit a message (MSG1 as depicted in FIG. 6A) including a preamble on a PRACH via the second beam. That is, the second beam may be configured with a PRACH for transmission of the MSG1. In certain aspects, the RA procedure at block 706 may be a two-step procedure, for example, as described herein with respect to FIG. 6B. As an example, the UE may transmit a message (e.g., MSGA as depicted in FIG. 6B) including a preamble on a PRACH and a payload on a PUSCH via the second beam. That is, the second beam may be configured with PRACH and a PUSCH for transmission of the MSGA.

In certain aspects, the network entity may include a non-terrestrial network entity, such as an airborne platform or a spaceborne platform (e.g., the satellite 140). The UE may communicate with the non-terrestrial network entity via the selected second beam. For example, the UE may transmit MSG1 or MSGA to the non-terrestrial network entity via the second beam.

While the examples are described herein with respect to selecting a narrow beam from one or more sets of narrow beams as indicated by a wide beam for random access to facilitate understanding, the present disclosure also applies to selecting a beam from one or more sets of beams independent of the width of the beams. That is, the candidate beams available for selection may have the same or different coverage area as the beam indicating the candidate beams. In certain cases, the candidate beams may not be in the coverage area of the beam indicating the candidate beams.

Figure 8:
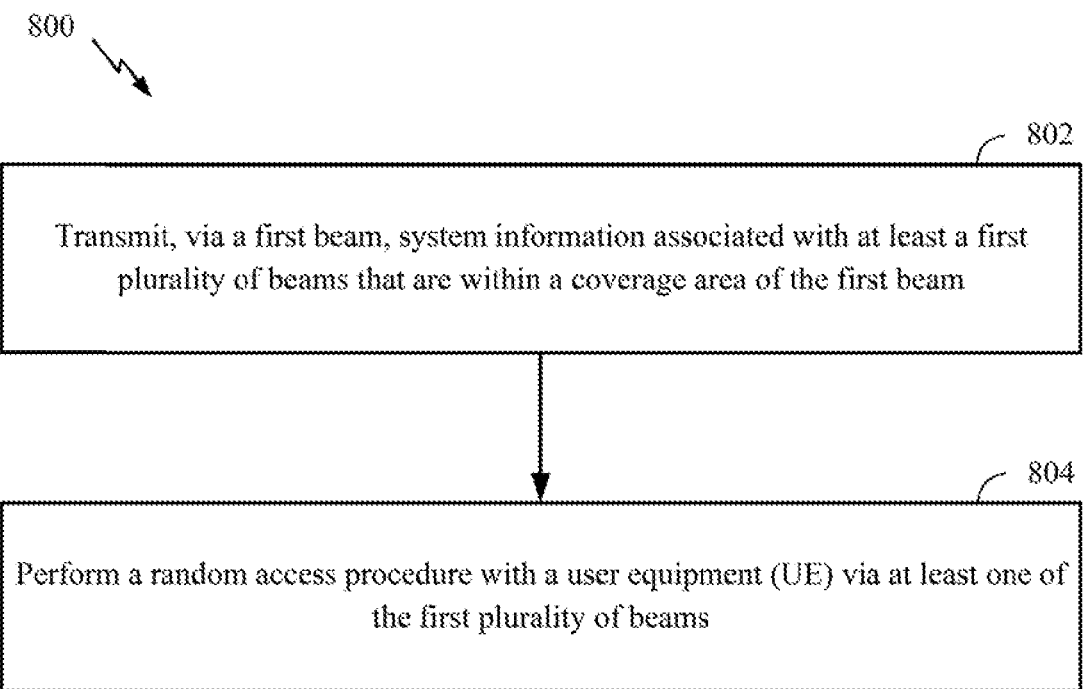
FIG. 8 is a flow diagram illustrating example operations for wireless communication by a network entity, in accordance with certain aspects of the present disclosure.

FIG. 8 is a flow diagram illustrating example operations 800 for wireless communication, in accordance with certain aspects of the present disclosure. The operations 800 may be performed, for example, by a network entity (such as the BS 110a and/or a non-terrestrial network entity (e.g., the satellite 140)). The operations 800 may be complementary to the operations 700 performed by the UE. The operations 800 may be implemented as software components that are executed and run on one or more processors (e.g., controller/ processor 240 of FIG. 2). Further, the transmission and reception of signals by the network entity in operations 800 may be enabled, for example, by one or more antennas (e.g., antennas 234 of FIG. 2). In certain aspects, the transmission and/or reception of signals by the network entity may be implemented via a bus interface of one or more processors (e.g., controller/processor 240) obtaining and/or outputting signals.

The operations 800 may begin, at block 802, where the network entity may transmit, via a first beam (e.g., the first wide beam 504), system information associated with at least a first plurality of beams (e.g., the first plurality of narrow beams 508a-f) that are within a coverage area of the first beam. At block 804, the network entity may perform a random access procedure with a UE (e.g., the UE 120a) via at least one of the first plurality of beams. As used herein, a network entity performing a random access procedure with a UE may include the network entity communicating with the UE via the random access signaling flow, for example, as described herein with respect to FIGS. 6A and 6B. For example, the network entity may receive MSG1, MSGA, or MSG3 from the UE, and the network entity may transmit a RAR (MSG2) or MSGB to the UE.

For certain aspects, the system information may include the one or more parameters described herein with respect to the operations 700, such as the RS resource indicator for each of the first plurality of beams, a RACH configuration for each of the first plurality of beams, and BWP configurations for each of the first plurality of beams.

In aspects, the system information may be for one or more sets of beams described herein with respect to the operations 700. Referring to FIG. 5, the system information may be received on the first wide beam 504, and the system information may be associated with the first plurality of narrow beams 508a-f. The system information may be further associated with a second plurality of beams (e.g., the second plurality of narrow beams 510*a-f*) that are within a coverage area of a third beam (e.g., the second wide beam 506). At block 804, the UE may perform the random access procedure via at least the first plurality of beams and the second plurality of beams.

In certain aspects, the network entity may be configured with a certain cell architecture for the wide beam(s) and corresponding narrow beams, for example, as described herein with respect to the operations 700. As an example, the first beam and the first plurality of beams may be configured as a single cell. In certain cases, the first beam, the first plurality of beams, the third beam, and the second plurality of beams may be configured as a single cell. For certain aspects, the first beam and the first plurality of beams may be configured as a first cell, and the third beam and the second plurality of beams may be configured as a second cell.

In certain aspects, the network entity may transmit an SSB on the first beam, where the SSB may include a PDCCH configuration that the UE can use to receive the system information associated with the beams, as described herein with respect to the operations 700. The network entity may transmit scheduling information on the PDCCH for the system information via the first beam. The network entity may transmit the system information according to the scheduling information.

In certain aspects, the network entity may transmit an indication of whether a given beam or a BWP associated with the given beam is barred from communications, for example as described herein with respect to the operations 700. For example, the network entity may identify that the first beam is overloaded with RA messages or other uplink traffic and bar any subsequent RA messages on the first beam with a beam/BWP-specific barring indication. With respect to the operations 800, the network entity may transmit an indication that the first beam or a BWP (e.g., an uplink BWP) of the first beam is barred for uplink transmission, and the network entity may perform the random access procedure via the at least one of the first plurality of beams in response to transmitting the indication and/or other criteria for barring uplink transmissions on the first beam.

For certain aspects, the RA procedure at block 804 may be a four-step procedure, for example, as described herein with respect to FIG. 6A. In certain aspects, the RA procedure at block 804 may be a two-step procedure, for example, as described herein with respect to FIG. 6B.

In certain aspects, the network entity may include a non-terrestrial network entity, such as an airborne platform or a spaceborne platform (e.g., the satellite 140).

In certain aspects, the network entity may identify that a particular beam or BWP is in an overloaded state, such that the beam or BWP cannot accept RA messages. In such a case, the network entity may transmit the beam/BWP-specific barring bit, as described herein with respect to the operations 700 and 800. While an overload scenario is described herein with respect to triggering the transmission of the beam/BWP-specific barring bit, aspects of the present disclosure may apply to other suitable scenarios and/or criteria for triggering the transmission of the barring bit. The beam/BWP-specific barring bit described herein may enable desirable capacity for random access at a beam and/or BWP granularity due to the capacity being dynamically distributed among multiple beams and/or BWPs of the beams.

Figure 9:
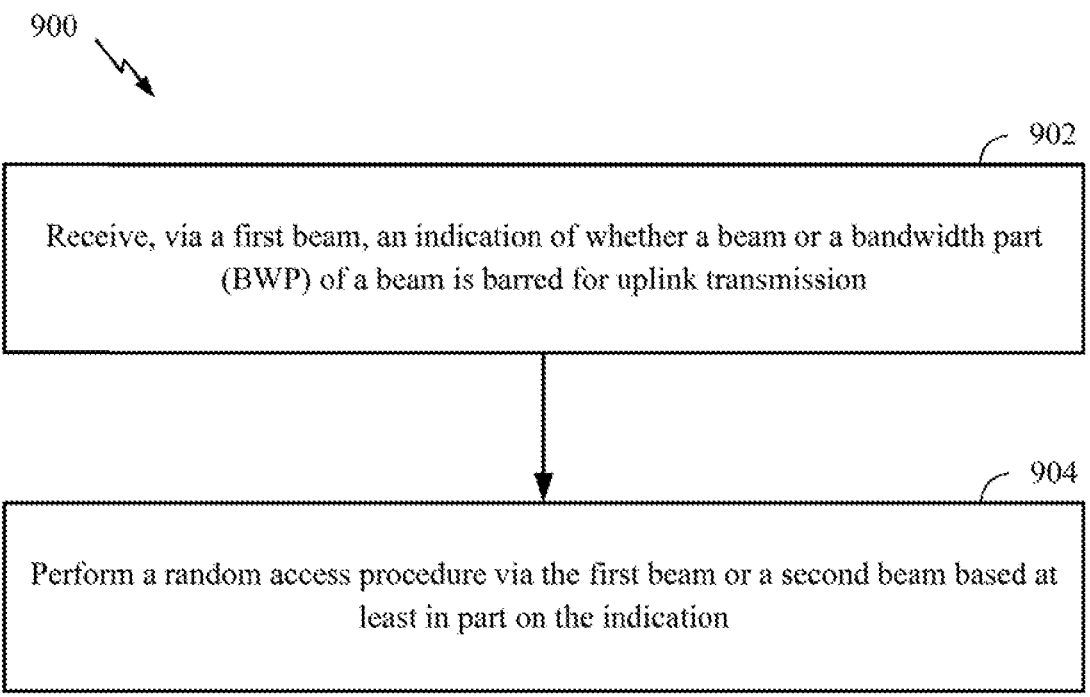
FIG. 9 is a flow diagram illustrating other example operations for wireless communication by a UE, in accordance with certain aspects of the present disclosure.

FIG. 9 is a flow diagram illustrating example operations 900 for wireless communication, in accordance with certain aspects of the present disclosure. The operations 900 may be performed, for example, by a UE (such as the UE 120*a* in the wireless communication network 100). The operations 900 may be implemented as software components that are executed and run on one or more processors (e.g., controller/processor 280 of FIG. 2). Further, the transmission and reception of signals by the UE in operations 900 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 900 may begin, at block 902, where the UE may receive, via a first beam (e.g., the first wide beam 504), an indication of whether a beam or a BWP (e.g., an uplink BWP) of a beam is barred for uplink transmission. For example, the indication may provide whether the first beam or another beam is barred for communication. Additionally, or alternatively, the indication may provide whether a BWP associated with the first beam or another beam is barred for communication. The indication may be included in a MIB (such as the MIB in a PBCH) or system information (such as a SIB).

At block 904, the UE may perform a random access procedure via the first beam or a second beam based at least in part on the indication. For example, if the first beam or the BWP associated with the first beam is barred, the UE may perform the beam selection operations for random access as described herein with respect to the operations 700. If the first beam or the BWP associated with the first beam is not barred, the UE may perform the beam selection operations as described herein with respect to the operations 700, where the beam selection may also include the first beam as a candidate beam for random access. That is, the UE may perform the random access procedure via at least one beam including the first beam and a first plurality of beams (which includes the second beam) in response to the indication indicating that the first beam or the BWP of the first beam is not barred for uplink transmission. In certain cases, the UE may default to performing random access with the first beam if the first beam or the BWP associated with the first beam is not barred. That is, the UE may perform the random access procedure via the first beam or the BWP of the first beam in response to the indication indicating that the first beam or the BWP of the first beam is not barred for uplink transmission.

For certain aspects, the RA procedure at block 904 may be a four-step procedure, for example, as described herein with respect to FIG. 6A. In certain aspects, the RA procedure at block 904 may be a two-step procedure, for example, as described herein with respect to FIG. 6B.

In certain aspects, the network entity may include a non-terrestrial network entity, such as an airborne platform or a spaceborne platform (e.g., the satellite 140). For example, at block 904, the UE may communicate with a non-terrestrial network entity via the first beam or the second beam.

Figure 10:
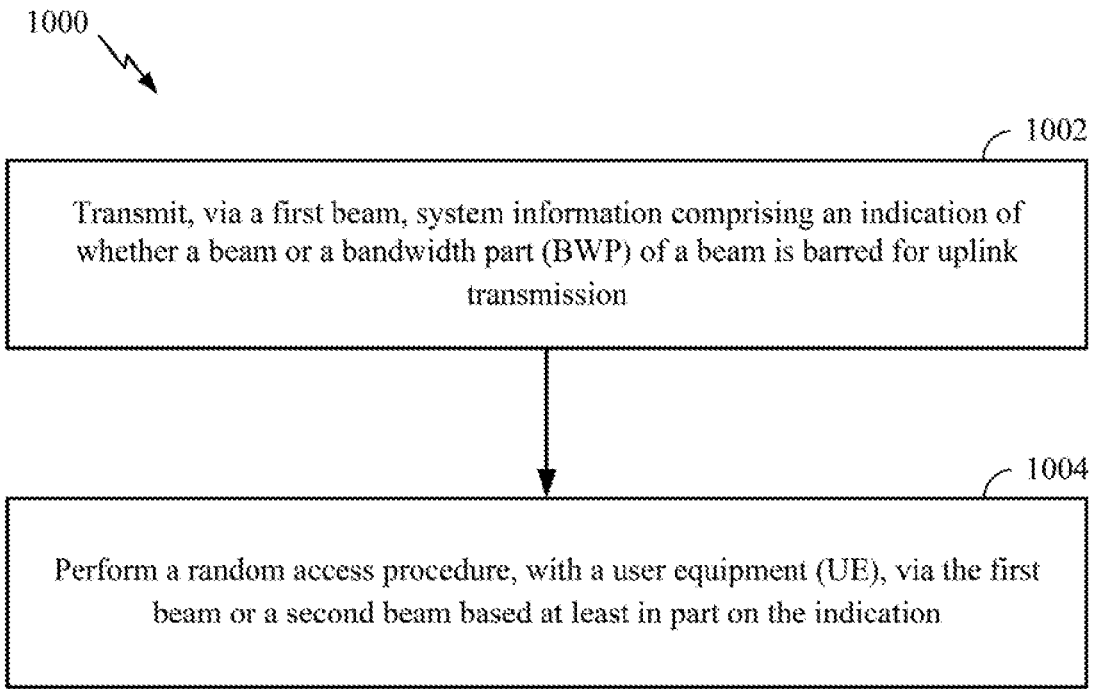
FIG. 10 is a flow diagram illustrating other example operations for wireless communication by a network entity, in accordance with certain aspects of the present disclosure.

FIG. 10 is a flow diagram illustrating example operations 1000 for wireless communication, in accordance with certain aspects of the present disclosure. The operations 1000 may be performed, for example, by a network entity (such as the BS 110*a* and/or a non-terrestrial network entity (e.g., the satellite 140)). The operations 1000 may be complementary to the operations 900 performed by the UE. The operations 1000 may be implemented as software components that are executed and run on one or more processors (e.g., controller/processor 240 of FIG. 2). Further, the transmission and reception of signals by the network entity in operations 1000 may be enabled, for example, by one or more antennas (e.g., antennas 234 of FIG. 2). In certain aspects, the transmission and/or reception of signals by the network entity may be implemented via a bus interface of one or more processors (e.g., controller/processor 240) obtaining and/or outputting signals.

The operations 1000 may begin, at block 1002, where the network entity may transmit, via a first beam (e.g., the first wide beam 504), an indication of whether a beam or a BWP (e.g., an uplink BWP) of a beam is barred for uplink transmission. For example, the indication may provide whether the first beam or another beam is barred for communication. Additionally, or alternatively, the indication may provide whether a BWP associated with the first beam or another beam is barred for communication.

At block 1004, the network entity may perform a random access procedure, with a UE (e.g., the UE 120a), via the first beam or a second beam based at least in part on the indication. For example, if the first beam or the BWP associated with the first beam is barred, the network entity may communicate with the UE via at least one of the beams selected for random access as described herein with respect to the operations 700 and/or 800. If the first beam or the BWP associated with the first beam is not barred, the network entity may communicate with the UE via at least one of the beams selected for random access as described herein with respect to the operations 700 and/or 800, where the first beam may also be a candidate beam for random access. That is, the network entity may perform the random access procedure via at least one beam including the first beam and a first plurality of beams (which includes the second beam) in response to the indication indicating that the first beam or the BWP of the first beam is not barred for uplink transmission. In certain cases, the network entity may default to communicating with the first beam for random access if the first beam or the BWP associated with the first beam is not barred. That is, the network entity may perform the random access procedure via the first beam or the BWP of the first beam in response to the indication indicating that the first beam or the BWP of the first beam is not barred for uplink transmission For certain aspects, the RA procedure at block 904 may be a four-step procedure, for example, as described herein with respect to FIG. 6A. In certain aspects, the RA procedure at block 904 may be a two-step procedure, for example, as described herein with respect to FIG. 6B.

In certain aspects, the network entity may include a non-terrestrial network entity, such as an airborne platform or a spaceborne platform (e.g., the satellite 140).

Figure 11:
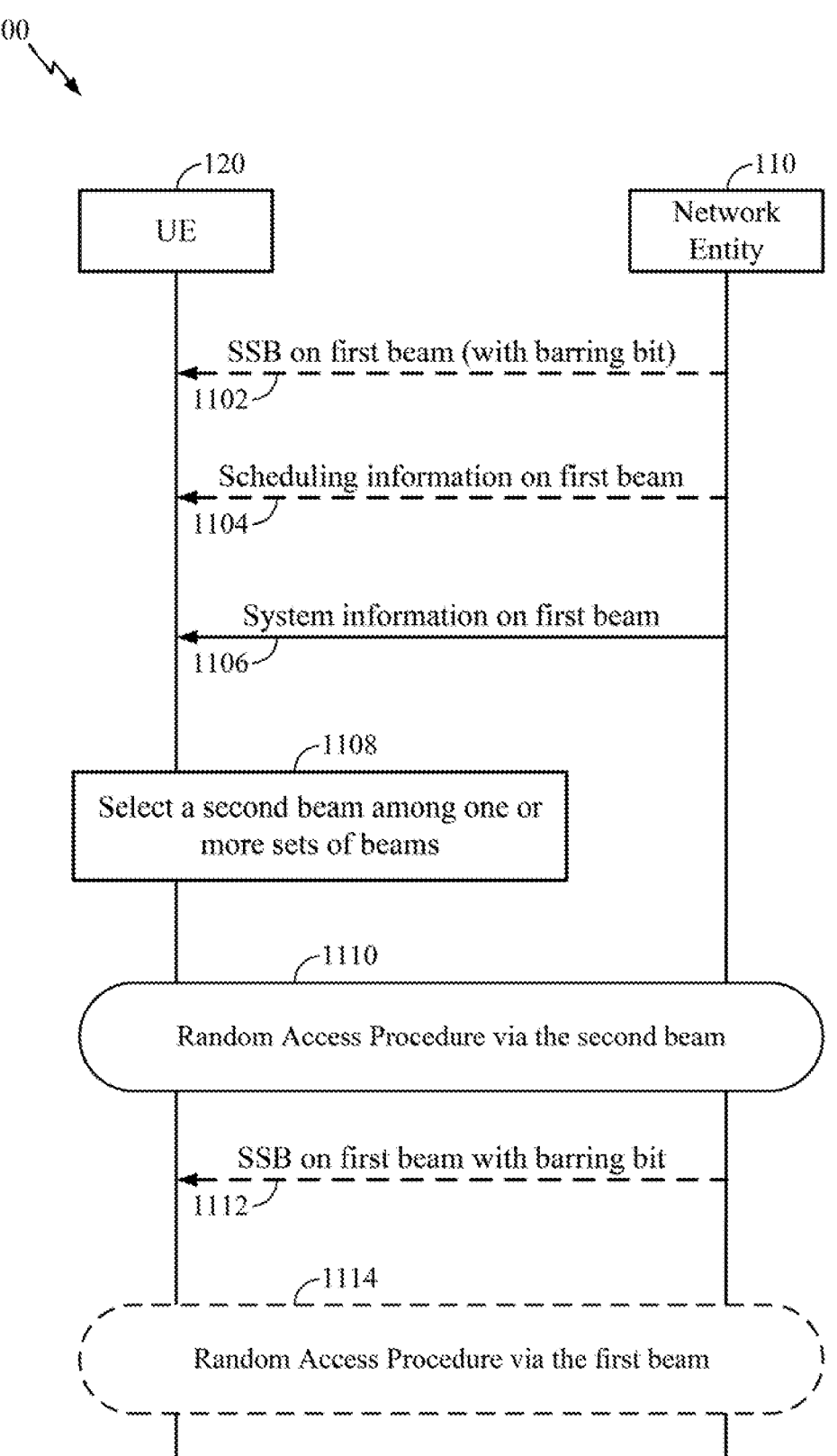
FIG. 11 is a signaling flow diagram illustrating example signaling for random access, in accordance with aspects of the present disclosure.

FIG. 11 is a signaling flow illustrating example signaling for random access beam selection and/or a beam/BWP barring bit, in accordance with certain aspects of the present disclosure. In this example, at 1102, the UE 120 may receive an SSB on a first beam (e.g., the first wide beam 504) from the network entity 110, which may include a base station and/or a non-terrestrial network entity. The SSB may include a PDCCH configuration indicating transmit occasions for scheduling information. In certain cases, the SSB may also include a beam/BWP-specific barring bit indicating whether a given beam or BWP associated with the given beam is barred for communications as described herein.

At 1104, the UE may monitor for scheduling information from the network entity 110 on the first beam based on the PDCCH configuration indicated in the SSB. The scheduling information may indicate the transmission occasions for additional system information (e.g., SIB1 or other SIBs).

At 1106, the UE 120 may receive system information on the first beam from the network entity 110. The system information may be associated with one or more sets of beams, such as the first plurality of narrow beams 508a-f and/or the second plurality of narrow beams 510a-f).

At 1108, the UE 120 may select a second beam (e.g., the narrow beam 508a) among the set(s) of beams. For example, the UE 120 may select the second beam based on the second beam having the highest RSRP among the set(s) of beams. In certain cases, the UE 120 may perform the beam selection at 1108 in response to the barring bit indicating that the first beam or a BWP associated with the first beam is barred for communications.

At 1110, the UE 120 may perform a RA procedure via the selected second beam, for example, as described herein with respect to FIG. 6A and/or FIG. 6B. As an example, the UE 120 may transmit a MSG1 or MSGA via the second beam to the network entity 110.

At 1112, the UE 120 may receive another SSB on the first beam with an updated barring bit. For example, the barring bit may indicate that the first beam or a BWP associated with the first beam is not barred.

At 1114, due to the first beam not being barred, the UE 120 may perform a RA procedure via the first beam. As an example, the UE 120 may transmit a MSG1 or MSGA via the first beam to the network entity 110. In certain cases, with the first beam not barred, if the UE receives system information associated with one or more sets of beams, the UE may perform beam selection with the first beam as a candidate beam.

Figure 12:
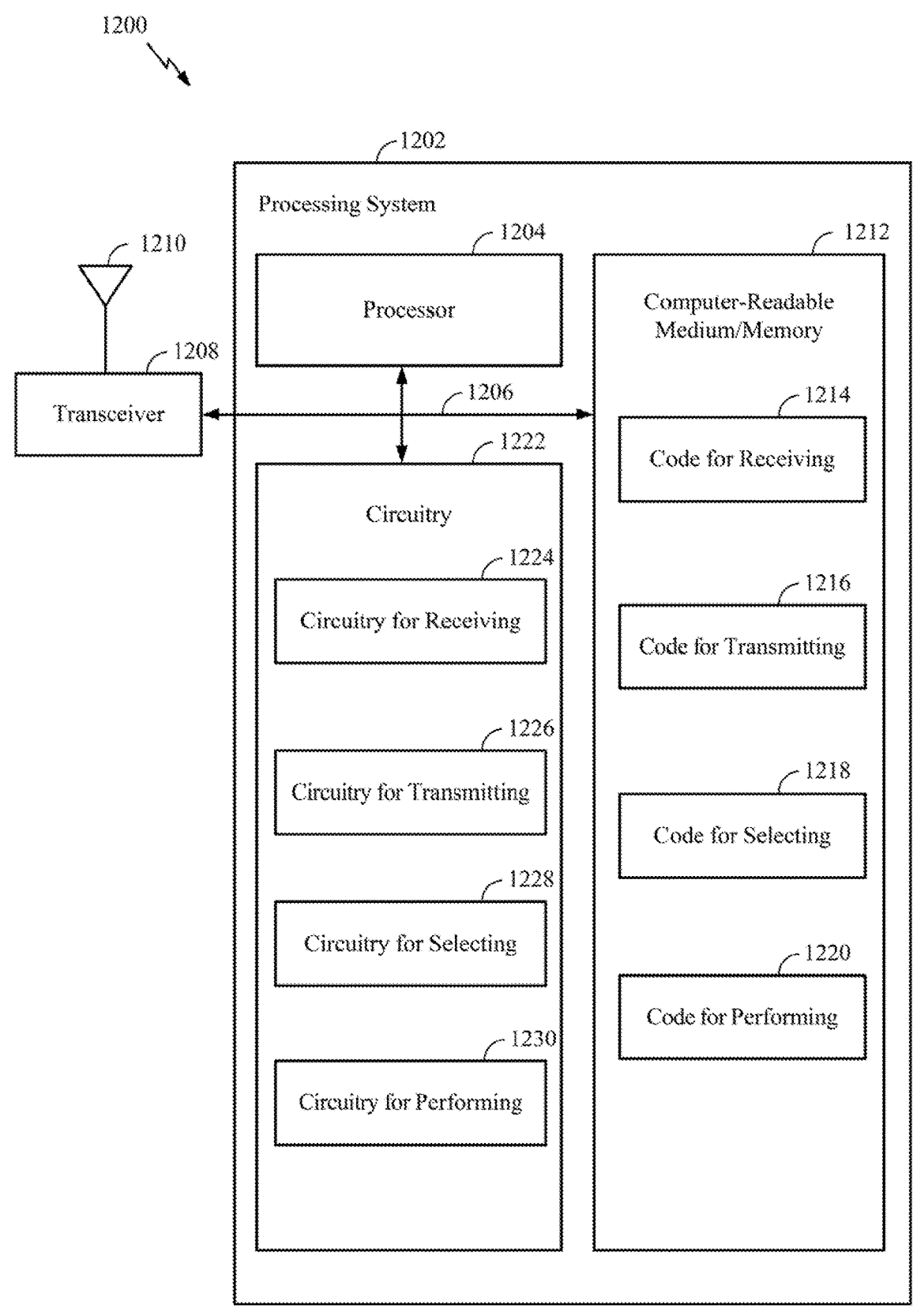
FIG. 12 illustrates a communications device (e.g., a UE) that may include various components configured to perform operations for the techniques disclosed herein in accordance with aspects of the present disclosure.

FIG. 12 illustrates a communications device 1200 (e.g., a UE) that may include various components (e.g., corresponding to means-plus-function components) configured to perform operations for the techniques disclosed herein, such as the operations illustrated in FIG. 7 and/or FIG. 9. The communications device 1200 includes a processing system 1202 coupled to a transceiver 1208 (e.g., a transmitter and/or a receiver). The transceiver 1208 is configured to transmit and receive signals for the communications device 1200 via an antenna 1210, such as the various signals as described herein. The processing system 1202 may be configured to perform processing functions for the communications device 1200, including processing signals received and/or to be transmitted by the communications device 1200.

The processing system 1202 includes a processor 1204 coupled to a computer-readable medium/memory 1212 via a bus 1206. In certain aspects, the computer-readable medium/memory 1212 is configured to store instructions (e.g., computer-executable code) that when executed by the processor 1204, cause the processor 1204 to perform the operations illustrated in FIG. 7 and/or FIG. 8, or other operations for performing the various techniques discussed herein for random access. In certain aspects, computer-readable medium/memory 1212 stores code for receiving 1214, code for transmitting 1216, code for selecting 1218, and/or code for performing 1220. In certain aspects, the processing system 1202 has circuitry 1222 configured to implement the code stored in the computer-readable medium/memory 1212. In certain aspects, the circuitry 1222 is coupled to the processor 1204 and/or the computer-readable medium/memory 1212 via the bus 1206. For example, the circuitry 1222 includes circuitry for receiving 1224, circuitry for transmitting 1226, circuitry for selecting 1228, and/or circuitry for performing 1230.

Figure 13:
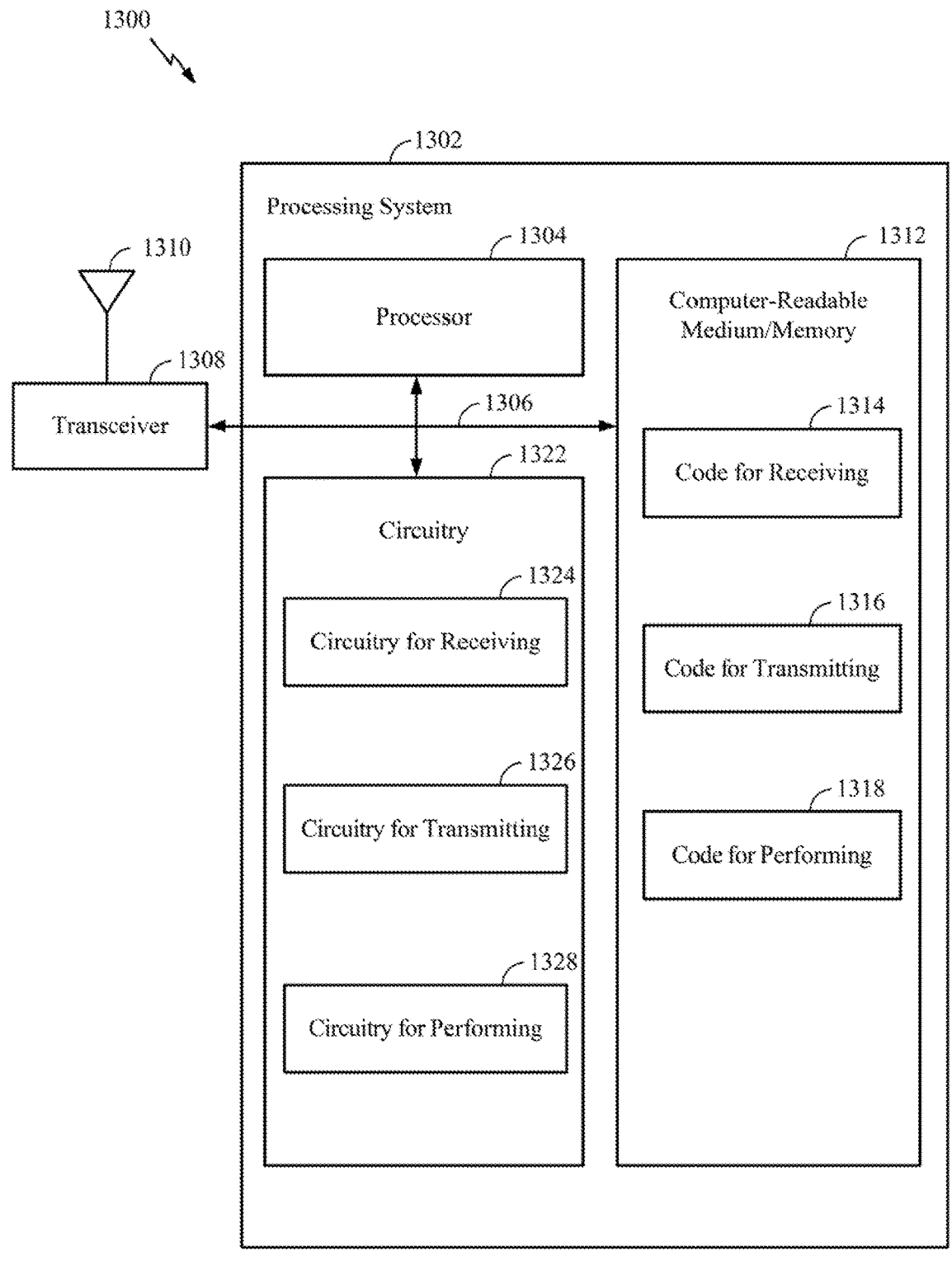
FIG. 13 illustrates a communications device (e.g., a BS and/or non-terrestrial network entity) that may include various components configured to perform operations for the techniques disclosed herein in accordance with aspects of the present disclosure.

FIG. 13 illustrates a communications device 1300 (e.g., a BS and/or a non-terrestrial network entity) that may include various components (e.g., corresponding to means-plus-function components) configured to perform operations for the techniques disclosed herein, such as the operations illustrated in FIG. 8 and/or FIG. 10. The communications device 1300 includes a processing system 1302 coupled to a transceiver 1308 (e.g., a transmitter and/or a receiver). The transceiver 1308 is configured to transmit and receive signals for the communications device 1300 via an antenna 1310, such as the various signals as described herein. The processing system 1302 may be configured to perform processing functions for the communications device 1300, including processing signals received and/or to be transmitted by the communications device 1300.

The processing system 1302 includes a processor 1304 coupled to a computer-readable medium/memory 1312 via a bus 1306. In certain aspects, the computer-readable medium/memory 1312 is configured to store instructions (e.g., computer-executable code) that when executed by the processor 1304, cause the processor 1304 to perform the operations illustrated in FIG. 8 and/or FIG. 10, or other operations for performing the various techniques discussed herein for random access. In certain aspects, computer-readable medium/memory 1312 stores code for receiving 1314, code for transmitting 1316, and/or code for performing 1318. In certain aspects, the processing system 1302 has circuitry 1322 configured to implement the code stored in the computer-readable medium/memory 1312. In certain aspects, the circuitry 1322 is coupled to the processor 1304 and/or the computer-readable medium/memory 1312 via the bus 1306. For example, the circuitry 1322 includes circuitry for receiving 1324, circuitry for transmitting 1326, and/or circuitry for performing 1328.

Example Aspects

In addition to the various aspects described above, specific combinations of aspects are within the scope of the disclosure, some of which are detailed below:

Aspect 1. A method of wireless communication by a user equipment (UE), comprising: receiving, from a network entity, via a first beam, system information associated with at least a first plurality of beams that are within a coverage area of the first beam; selecting a second beam among at least the first plurality of beams based at least in part on the system information; and performing a random access procedure via the selected second beam.

Aspect 2. The method of Aspect 1, wherein the system information includes: a reference signal (RS) resource indicator for each of the first plurality of beams; a random access channel configuration for each of the first plurality of beams; a downlink bandwidth part (BWP) configuration for each of the first plurality of beams; and an uplink BWP configuration for each of the first plurality of beams.

Aspect 3. The method of Aspect 2, wherein the system information includes at least one of: a global position indication for each of the first plurality of beams; or a channel state information reference signal (CSI-RS) configuration for each of the first plurality of beams.

Aspect 4. The method according to any of Aspects 2 or 3, wherein the RS resource indicator includes a CSI-RS resource indicator (CRI).

Aspect 5. The method according to any of Aspects 1-4, wherein the system information is further associated with a second plurality of beams that are within a coverage area of a third beam, and wherein selecting the second beam is further among at least the first plurality of beams and the second plurality of beams.

Aspect 6. The method according to any of Aspects 1-5, further comprising: monitoring reference signals associated with the first plurality of beams as indicated in the system information; and wherein selecting the second beam is further based at least in part on measurements of the reference signals derived from monitoring the reference signals.

Aspect 7. The method according to any of Aspects 1-6, further comprising: determining distances from a position of the UE to positions of the first plurality of beams as indicated in the system information; and wherein selecting the second beam is further based at least in part on the determined distances.

Aspect 8. The method of Aspect 7, wherein selecting the second beam is based on the second beam being associated with a shortest distance among at least the determined distances.

Aspect 9. The method according to any of Aspects 1-8, wherein the first beam and the first plurality of beams are configured as a single cell.

Aspect 10. The method of Aspect 5, wherein the first beam, the first plurality of beams, the third beam, and the second plurality of beams are configured as a single cell.

Aspect 11. The method of Aspect 5, wherein the first beam and the first plurality of beams are configured as a first cell, and the third beam and the second plurality of beams are configured as a second cell.

Aspect 12. The method according to any of Aspects 1-11, further comprising: acquiring at least one of time or frequency synchronization via a synchronization signal block (SSB) on the first beam; receiving scheduling information for the system information via the first beam based on information indicated in the SSB; and wherein receiving the system information comprises receiving the system information based on the scheduling information.

Aspect 13. The method of Aspect 12, further comprising identifying the first beam by an SSB index associated with the SSB.

Aspect 14. The method of Aspect 5, further comprising identifying the third beam by an SSB index.

Aspect 15. The method according to any of Aspects 1-14, further comprising: receiving an indication that the first beam or an uplink BWP of the first beam is barred for uplink transmission; and wherein selecting the second beam and performing the random access procedure via the second beam is in response to receiving the indication.

Aspect 16. The method according to any of Aspects 1-15, wherein performing the random access procedure comprises transmitting a message including a preamble on a physical random access channel (PRACH) via the second beam.

Aspect 17. The method according to any of Aspects 1-15, wherein performing the random access procedure comprises transmitting a message including a preamble on a PRACH and a payload on a physical uplink shared channel (PUSCH) via the second beam.

Aspect 18. The method according to any of Aspects 1-17, wherein: the network entity includes a non-terrestrial network entity; and performing the random access procedure comprises communicating with the non-terrestrial network entity via the selected second beam.

Aspect 19. A method of wireless communication by a network entity, comprising: transmitting, via a first beam, system information associated with at least a first plurality of beams that are within a coverage area of the first beam; and performing a random access procedure with a user equipment (UE) via at least one of the first plurality of beams.

Aspect 20. The method of Aspect 19, wherein the system information includes: a reference signal (RS) resource indicator for each of the first plurality of beams; a random access channel configuration for each of the first plurality of beams;

a downlink bandwidth part (BWP) configuration for each of the first plurality of beams; and an uplink BWP configuration for each of the first plurality of beams.

Aspect 21. The method of Aspect 20, wherein the system information includes at least one of: a global position indication for each of the first plurality of beams; or a channel state information reference signal (CSI-RS) configuration for each of the first plurality of beams.

Aspect 22. The method according to any of Aspects 20 or 21, wherein the RS resource indicator includes a CSI-RS resource indicator (CRI).

Aspect 23. The method according to any of Aspects 19-22, wherein the system information is further associated with a second plurality of beams that are within a coverage area of a third beam, and wherein performing the random access procedure is further via at least the first plurality of beams and the second plurality of beams.

Aspect 24. The method according to any of Aspects 19-23, wherein the first beam and the first plurality of beams are configured as a single cell.

Aspect 25. The method of Aspect 23, wherein the first beam, the first plurality of beams, the third beam, and the second plurality of beams are configured as a single cell.

Aspect 26. The method of Aspect 23, wherein the first beam and the first plurality of beams are configured as a first cell, and the third beam and the second plurality of beams are configured as a second cell.

Aspect 27. The method according to any of Aspects 19-26, further comprising: transmitting a synchronization signal block (SSB) on the first beam; transmitting scheduling information for the system information via the first beam; and wherein transmitting the system information comprises transmitting the system information according to the scheduling information.

Aspect 28. The method according to any of Aspects 19-27, further comprising: transmitting an indication that the first beam or an uplink BWP of the first beam is barred for uplink transmission; and wherein performing the random access procedure via the at least one of the first plurality of beams is in response to transmitting the indication.

Aspect 29. The method according to any of Aspects 19-28, wherein performing the random access procedure comprises receiving a message including a preamble on a physical random access channel (PRACH) via the at least one of the first plurality of beams.

Aspect 30. The method according to any of Aspects 19-28, wherein performing the random access procedure comprises receiving a message including a preamble on a PRACH and a payload on a physical uplink shared channel (PUSCH) via the at least one of the first plurality of beams.

Aspect 31. The method according to any of Aspects 19-30, wherein the network entity includes a non-terrestrial network entity.

Aspect 32. A method of wireless communication by a user equipment, comprising: receiving, via a first beam, an indication of whether a beam or an uplink bandwidth part (BWP) of a beam is barred for uplink transmission; and performing a random access procedure via the first beam or a second beam based at least in part on the indication.

Aspect 33. The method of Aspect 32, further comprising performing the method according to any of Aspects 1-14 in response to the indication indicating that the first beam or the uplink BWP of the first beam is barred for uplink transmission.

Aspect 34. The method of Aspect 32, wherein performing the random access procedure comprises performing the random access procedure via the first beam in response to the indication indicating that the first beam is not barred for uplink transmission.

Aspect 35. The method of Aspect 32, wherein performing the random access procedure comprises performing the random access procedure via at least one beam including the first beam and a first plurality of beams in response to the indication indicating that the first beam is not barred for uplink transmission, where the first plurality of beams includes the second beam.

Aspect 36. The method according to any of Aspects 32-35, wherein performing the random access procedure comprises transmitting a message including a preamble on a physical random access channel (PRACH) via the second beam.

Aspect 37. The method according to any of Aspects 32-35, wherein performing the random access procedure comprises transmitting a message including a preamble on a PRACH and a payload on a physical uplink shared channel (PUSCH) via the second beam.

Aspect 38. The method according to any of Aspects 32-37, wherein performing the random access procedure comprises communicating with a non-terrestrial network entity via the first beam or the second beam.

Aspect 39. A method of wireless communication by a network entity, comprising: transmitting, via a first beam, an indication of whether a beam or an uplink bandwidth part (BWP) of a beam is barred for uplink transmission; and performing a random access procedure, with a user equipment (UE), via the first beam or a second beam based at least in part on the indication.

Aspect 40. The method of Aspect 39, further comprising performing the method according to any of Aspects 19-27 in response to the indication indicating that the first beam or a BWP of the first beam is barred for uplink transmission.

Aspect 41. The method of Aspect 39, wherein performing the random access procedure comprises performing the random access procedure via the first beam in response to the indication indicating that the first beam is not barred for uplink transmission.

Aspect 42. The method of Aspect 39, wherein performing the random access procedure comprises performing the random access procedure via at least one beam including the first beam and a first plurality of beams in response to the indication indicating that the first beam is not barred for uplink transmission, wherein the first plurality of beams includes the second beam.

Aspect 43. The method according to any of Aspects 39-42, wherein performing the random access procedure comprises receiving a message including a preamble on a physical random access channel (PRACH) via at least one of a first plurality of beams.

Aspect 44. The method according to any of Aspects 39-42, wherein performing the random access procedure receiving a message including a preamble on a PRACH and a payload on a physical uplink shared channel (PUSCH) via at least one of a first plurality of beams.

Aspect 45. The method according to any of Aspects 39-44, wherein the network entity includes a non-terrestrial network entity.

Aspect 46. An apparatus for wireless communication, comprising: a transceiver configured to receive, from a network entity, via a first beam, system information associated with at least a first plurality of beams that are within a coverage area of the first beam; a memory; and a processor coupled to the memory, the processor and the memory being configured to select a second beam among at least the first plurality of beams based at least in part on the system information; wherein the transceiver is further configured to perform a random access procedure via the selected second beam.

Aspect 47. The apparatus of Aspect 46, the apparatus being configured to perform the method of any of Aspects 1 through 18.

Aspect 48. An apparatus for wireless communication, comprising: a transceiver configured to: transmit, via a first beam, system information associated with at least a first plurality of beams that are within a coverage area of the first beam, and perform a random access procedure with a user equipment (UE) via at least one of the first plurality of beams.

Aspect 49. The apparatus of Aspect 48, the apparatus being configured to perform the method of any of Aspects 19 through 31.

Aspect 50. An apparatus for wireless communication, comprising: a transceiver configured to: receive, via a first beam, an indication of whether a beam or an uplink bandwidth part (BWP) of a beam is barred for uplink transmission, and perform a random access procedure via the first beam or a second beam based at least in part on the indication.

Aspect 51. The apparatus of Aspect 50, the apparatus being configured to perform the method of any of Aspects 32 through 38.

Aspect 52. An apparatus for wireless communication, comprising: a transceiver configured to: transmit, via a first beam, an indication of whether a beam or an uplink bandwidth part (BWP) of a beam is barred for uplink transmission, and perform a random access procedure, with a user equipment (UE), via the first beam or a second beam based at least in part on the indication.

Aspect 53. The apparatus of Aspect 52, the apparatus being configured to perform the method of any of Aspects 39 through 45.

Aspect 54. An apparatus for wireless communication, comprising: means for receiving, from a network entity, via a first beam, system information associated with at least a first plurality of beams that are within a coverage area of the first beam; means for selecting a second beam among at least the first plurality of beams based at least in part on the system information; and means for performing a random access procedure via the selected second beam.

Aspect 55. The apparatus of Aspect 54, the apparatus comprising means for performing the method of any of Aspects 1 through 18.

Aspect 56. An apparatus for wireless communication, comprising: means for transmitting, via a first beam, system information associated with at least a first plurality of beams that are within a coverage area of the first beam; and means for performing a random access procedure with a user equipment (UE) via at least one of the first plurality of beams.

Aspect 57. The apparatus of Aspect 56, the apparatus comprising means for performing the method of any of Aspects 19 through 31.

Aspect 58. An apparatus for wireless communication, comprising: means for receiving, via a first beam, an indication of whether a beam or an uplink bandwidth part (BWP) of a beam is barred for uplink transmission; and means for performing a random access procedure via the first beam or a second beam based at least in part on the indication.

Aspect 59. The apparatus of Aspect 58, the apparatus comprising means for performing the method of any of Aspects 32 through 38.

Aspect 60. An apparatus for wireless communication, comprising: means for transmitting, via a first beam, an indication of whether a beam or an uplink bandwidth part (BWP) of a beam is barred for uplink transmission; and means for performing a random access procedure, with a user equipment (UE), via the first beam or a second beam based at least in part on the indication.

Aspect 61. The apparatus of Aspect 60, the apparatus comprising means for performing the method of any of Aspects 39 through 45.

Aspect 62. A computer readable medium having instructions stored thereon for: receiving, from a network entity, via a first beam, system information associated with at least a first plurality of beams that are within a coverage area of the first beam; selecting a second beam among at least the first plurality of beams based at least in part on the system information; and performing a random access procedure via the selected second beam.

Aspect 63. The computer readable medium of Aspect 62, the computer readable medium having instructions stored thereon to perform the method of any of Aspects 1 through 18.

Aspect 64. A computer readable medium having instructions stored thereon for: transmitting, via a first beam, system information associated with at least a first plurality of beams that are within a coverage area of the first beam; and performing a random access procedure with a user equipment (UE) via at least one of the first plurality of beams.

Aspect 65. The computer readable medium of Aspect 64, the computer readable medium having instructions stored thereon to perform the method of any of Aspects 19 through 31.

Aspect 66. A computer readable medium having instructions stored thereon for: receiving, via a first beam, an indication of whether a beam or an uplink bandwidth part (BWP) of a beam is barred for uplink transmission; and performing a random access procedure via the first beam or a second beam based at least in part on the indication.

Aspect 67. The computer readable medium of Aspect 66, the computer readable medium having instructions stored thereon to perform the method of any of Aspects 32 through 38.

Aspect 68. A computer readable medium having instructions stored thereon for: transmitting, via a first beam, an indication of whether a beam or an uplink bandwidth part (BWP) of a beam is barred for uplink transmission; and performing a random access procedure, with a user equipment (UE), via the first beam or a second beam based at least in part on the indication.

Aspect 69. The computer readable medium of Aspect 68, the computer readable medium having instructions stored thereon to perform the method of any of Aspects 39 through 45.

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

The methods disclosed herein comprise one or more steps or actions for achieving the methods. The method steps and/or actions may be interchanged with one another. In other words, unless a specific order of steps or actions is specified, the order and/or use of specific steps and/or actions may be modified.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, a digital signal processor (DSP), an application specific integrated circuit (ASIC), or a processor (e.g., a general purpose or specifically programmed processor). Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a DSP, an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above can also be considered as examples of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIG. 7, FIG. 8, FIG. 9, and/or FIG. 10.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above.

The invention claimed is:

1. An apparatus for wireless communication at a user equipment (UE), comprising: a memory comprising computer-executable instructions; and one or more processors configured to execute the computer-executable instructions and cause the apparatus to:
   receive, from a network entity, via a first beam, system information associated with at least a first plurality of beams that are within a coverage area of the first beam wherein the system information includes:
      a reference signal (RS) resource indicator for each of the first plurality of beams;
      a random access channel configuration for each of the first plurality of beams;
      a downlink bandwidth part (BWP) configuration for each of the first plurality of beams; and
      an uplink BWP configuration for each of the first plurality of beams;
   select a second beam among at least the first plurality of beams based at least in part on the system information; and
   perform a random access procedure via the selected second beam.

2. The apparatus of claim 1, wherein the system information includes at least one of:
   a global position indication for each of the first plurality of beams; or
   a channel state information reference signal (CSI-RS) configuration for each of the first plurality of beams.

3. The apparatus of claim 1, wherein the RS resource indicator includes a CSI-RS resource indicator (CRI).

4. The apparatus of claim 1, wherein the system information is further associated with a second plurality of beams that are within a coverage area of a third beam, and wherein selecting the second beam is further among at least the first plurality of beams and the second plurality of beams.

5. The apparatus of claim 4, wherein the first beam, the first plurality of beams, the third beam, and the second plurality of beams are configured as a single cell.

6. The apparatus of claim 4, wherein the first beam and the first plurality of beams are configured as a first cell, and the third beam and the second plurality of beams are configured as a second cell.

7. The apparatus of claim 4, wherein the one or more processors are further configured to execute the computer-executable instructions and cause the apparatus to:
   identify the third beam by an SSB index.

8. The apparatus of claim 1, wherein the one or more processors are further configured to execute the computer-executable instructions and cause the apparatus to:

monitor reference signals associated with the first plurality of beams as indicated in the system information, wherein selecting the second beam is further based at least in part on measurements of the reference signals derived from monitoring the reference signals.

9. The apparatus of claim 1, wherein the one or more processors are further configured to execute the computer-executable instructions and cause the apparatus to:
   determine distances from a position of the UE to positions of the first plurality of beams as indicated in the system information,
   wherein selecting the second beam is further based at least in part on the determined distances.

10. The apparatus of claim 9, wherein selecting the second beam is based on the second beam being associated with a shortest distance among at least the determined distances.

11. The apparatus of claim 1, wherein the first beam and the first plurality of beams are configured as a single cell.

12. The apparatus of claim 1, wherein the one or more processors are further configured to execute the computer-executable instructions and cause the apparatus to:
   acquire at least one of time or frequency synchronization via a synchronization signal block (SSB) on the first beam; and
   receive scheduling information for the system information via the first beam based on information indicated in the SSB,
   wherein receiving the system information comprises receiving the system information based on the scheduling information.

13. The apparatus of claim 12, wherein the one or more processors are further configured to execute the computer-executable instructions and cause the apparatus to:
   identify the first beam by an SSB index associated with the SSB.

14. The apparatus of claim 1, wherein the one or more processors are further configured to execute the computer-executable instructions and cause the apparatus to:
   receive an indication that the first beam or an uplink BWP of the first beam is barred for uplink transmission,
   wherein selecting the second beam and performing the random access procedure via the second beam is in response to receiving the indication.

15. The apparatus of claim 1, wherein performing the random access procedure comprises transmitting a message including a preamble on a physical random access channel (PRACH) via the second beam.

16. The apparatus of claim 1, wherein performing the random access procedure comprises transmitting a message including a preamble on a PRACH and a payload on a physical uplink shared channel (PUSCH) via the second beam.

17. The apparatus of claim 1, wherein:
   the network entity includes a non-terrestrial network entity; and
   performing the random access procedure comprises communicating with the non-terrestrial network entity via the selected second beam.

18. An apparatus for wireless communication at a user equipment (UE), comprising: a memory comprising computer-executable instructions; and one or more processors configured to execute the computer-executable instructions and cause the apparatus to:
   receive, via a first beam, an indication of whether a beam or an uplink bandwidth part (BWP) of a beam is barred for uplink transmission, wherein the indication is included in system information and the system information includes:

a reference signal (RS) resource indicator for each of a first plurality of beams including the beam; a random access channel configuration for each of the first plurality of beams;

a downlink bandwidth part (BWP) configuration for each of the first plurality of beams; and an uplink BWP configuration for each of the first plurality of beams; and perform a random access procedure via the first beam or a second beam based at least in part on the indication.

19. The apparatus of claim 18, wherein the receiving and the performing are in response to the indication indicating that the first beam or the uplink BWP of the first beam is barred for uplink transmission.

20. The apparatus of claim 18, wherein performing the random access procedure comprises performing the random access procedure via the first beam in response to the indication indicating that the first beam is not barred for uplink transmission.

21. The apparatus of claim 18, wherein performing the random access procedure comprises performing the random access procedure via at least one beam including the first beam and a first plurality of beams in response to the indication indicating that the first beam is not barred for uplink transmission, where the first plurality of beams includes the second beam.

22. The apparatus according to claim 18, wherein performing the random access procedure comprises transmitting a message including a preamble on a physical random access channel (PRACH) via the second beam.

23. The apparatus according to claim 18, wherein performing the random access procedure comprises transmitting a message including a preamble on a PRACH and a payload on a physical uplink shared channel (PUSCH) via the second beam.

24. The apparatus according to claim 18, wherein performing the random access procedure comprises communicating with a non-terrestrial network entity via the first beam or the second beam.

25. An apparatus for wireless communication at a network entity, comprising: a memory comprising computer-executable instructions; and one or more processors configured to execute the computer-executable instructions and cause the apparatus to:

transmit, via a first beam, an indication of whether a beam or an uplink bandwidth part (BWP) of a beam is barred for uplink transmission, wherein the indication is included in system information and the system information includes:

a reference signal (RS) resource indicator for each of a first plurality of beams including the beam; a random access channel configuration for each of the first plurality of beams;

a downlink bandwidth part (BWP) configuration for each of the first plurality of beams; and an uplink BWP configuration for each of the first plurality of beams; and perform a random access procedure, with a user equipment (UE), via the first beam or a second beam based at least in part on the indication.

26. The apparatus of claim 25, wherein the transmitting and the performing are in response to the indication indicating that the first beam or a BWP of the first beam is barred for uplink transmission.

27. The apparatus of claim 25, wherein performing the random access procedure comprises performing the random access procedure via the first beam in response to the indication indicating that the first beam is not barred for uplink transmission.

28. The apparatus of claim 25, wherein performing the random access procedure comprises performing the random access procedure via at least one beam including the first beam and a first plurality of beams in response to the indication indicating that the first beam is not barred for uplink transmission, wherein the first plurality of beams includes the second beam.

29. The apparatus according to claim 25, wherein performing the random access procedure comprises receiving a message including a preamble on a physical random access channel (PRACH) via at least one of a first plurality of beams.

* * * * *